United States Patent
Aono

(10) Patent No.: US 8,225,211 B2
(45) Date of Patent: Jul. 17, 2012

(54) DISPLAY CONTROL APPARATUS, DISPLAY CONTROL METHOD, AND COMPUTER-READABLE RECORDING MEDIUM STORING DISPLAY CONTROL PROGRAM

(75) Inventor: Yoshiko Aono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 960 days.

(21) Appl. No.: 12/193,915

(22) Filed: Aug. 19, 2008

(65) Prior Publication Data

US 2009/0064050 A1 Mar. 5, 2009

(30) Foreign Application Priority Data

Aug. 28, 2007 (JP) ................................. 2007-221411

(51) Int. Cl.
*G06F 13/00* (2006.01)
*G06F 15/00* (2006.01)
(52) U.S. Cl. ......................... 715/734; 715/743; 715/751
(58) Field of Classification Search .......... 715/764–765, 715/840–843, 851–853, 734, 743, 748, 751, 715/737, 761
See application file for complete search history.

(56) References Cited

U.S. PATENT DOCUMENTS

| | | | | |
|---|---|---|---|---|
| 7,787,158 B2 * | 8/2010 | Matsuda | ........................ | 358/462 |
| 2006/0238793 A1 * | 10/2006 | Akashi et al. | ................. | 358/1.13 |
| 2007/0223068 A1 | 9/2007 | Ishii et al. | | |
| 2007/0279667 A1 | 12/2007 | Hattori et al. | | |
| 2008/0016540 A1 | 1/2008 | Savoor et al. | | |
| 2009/0055764 A1 * | 2/2009 | Katsumata | ..................... | 715/764 |

FOREIGN PATENT DOCUMENTS

| | | |
|---|---|---|
| JP | 8-123649 | 5/1996 |
| JP | 2006-505025 | 2/2006 |
| WO | WO 03/104964 A2 | 12/2003 |

OTHER PUBLICATIONS

Japanese Office Action issued Nov. 15, 2011, in Patent Application No. 2007-221411.

* cited by examiner

*Primary Examiner* — Kevin Nguyen
(74) *Attorney, Agent, or Firm* — Oblon, Spivak, McClelland, Maier & Neustadt, L.L.P.

(57) ABSTRACT

A display control apparatus is disclosed. The display control apparatus includes a number of items determining unit which determines the number of selection items to be simultaneously displayed in an item selection list on an operating screen based on a selection of a button on the operating screen, a position determining unit which determines an upper end position of the item selection list on the operating screen to be a position so that a part of the selection items in the item selection list is displayed in a direction inverse to a normal extending direction of the selection item list with a position of the selected button as a reference based on a comparison of the number of the selection items to be simultaneously displayed with the displayable number of selection items on the operating screen, and a generating unit which generates the item selection list on the operating screen based on the determined position.

18 Claims, 25 Drawing Sheets

FIG.14

```
<layout name="PDTemplate2">                                                                                                    1312
  <pulldownlist content="PLOTTER_DOC_PAPER_FACE" style="PDItemStyle" background="/plotterdoc/appearance/WH_0002_003" >          1313
    <listitem position="PullDownItem_1"/>      1313-1
    <listitem position="PullDownItem_2"/>      1313-2
    <listitem position="PullDownItem_3"/>      1313-3
    <listitem position="PullDownItem_4"/>      1313-4
    <listitem position="PullDownItem_5"/>      1313-5
    <icon name="COMBOBOX_HEADER_BG" position="PDItemLabel_Pos1" source="/plotterdoc/appearance/IG_0020"/>    1314
    <text name="COMBOBOX_TITLE" position="PDItemLabel_Pos2" text="DocumentSurface" fontsize="16" align="center"/>    1315
    <pushbutton name="COMBOBOX_PREV_BUTTON" position="PDItemScroll_Pos4" style="/plotterdoc/appearance/BW_0005_001" repeat="false"/>    1316
    <pushbutton name="COMBOBOX_NEXT_BUTTON" position="PDItemScroll_Pos5" style="/plotterdoc/appearance/BW_0006_001" repeat="false"/>    1317
    <icon name="COMBOBOX_FOOTER_BG" position="PDItemScroll_Pos2" source="/plotterdoc/appearance/IG_0021"/>    1318
  </pulldownlist>
</layout>
```

```
<function name="PLOTTER_DOC_PAPER_FACE" resource="" displayname="DocumentSurface" description="" available="true" relocatable="true">    ~1321
  <function name="DuplexSideLT" resource="PullDownItem_DuplexSideLT.xml" displayname="" description="" available="true" relocatable="true" />    ~1322-1
  <function name="DuplexSideTT" resource="PullDownItem_DuplexSideTT.xml" displayname="" description="" available="true" relocatable="true" />    ~1322-2
  <function name="SingleSide" resource="PullDownItem_SingleSide.xml" displayname="" description="" available="true" relocatable="true" />    ~1322-3
</function>
                      1322-3a
```
~132

FIG.16

```
<layout>
  <pushbutton name="WID_PullDownItem_SingleSide" position="Pos1" style="/scannerdoc/appearance/BP_0002_002" repeat="false">
    <command name="faceTypeSelected">          }~1331
      <set content="faceTypeSelected.ONE_SIDED" />
      <close />
    </command>
    <text name="WID_PullDownItem_SingleSideText" position="Pos2" text="SingleSide"/>  ~1332
  </pushbutton>                        1332a        1332b    1332c
</layout>
```
~133

```xml
<layout name="PTF_Menu_001_PD_Staple">
<pulldownlist content="PD_STAPLE" style="PD_STAPLEStyle" background="/plotterdoc/appearance/WH_0002_002">
    <listitem position="Item_1"/>   1342-1
    <listitem position="Item_2"/>   1342-2
    <listitem position="Item_3"/>   1342-3
    <listitem position="Item_4"/>   1342-4
    <listitem position="Item_5"/>   1342-5
    <listitem position="Item_6"/>   1342-6
    <listitem position="Item_7"/>   1342-7
    <listitem position="Item_8"/>   1342-8
    <icon name="LabelIcon" position="LabelIcon" source="/plotterdoc/appearance/IG_0008"/>
    <text name="LabelText" position="LabelText" textId="PTF-LCD_0141" fontfamily="_sans" fontsize="16" fontcolor="" align="left"/>
    <icon name="COMBOBOX_FOOTER_BG" position="PageIcon" source="/plotterdoc/appearance/IG_0009"/>
    <text name="PageText" position="PageText" text="" fontfamily="_sans" fontsize="16" fontcolor="" align="center"/>
    <pushbutton name="COMBOBOX_PREV_BUTTON" position="ScrollUp" style="/plotterdoc/appearance/BW_0005_001" repeat="false">
        <!--<command name="EVENT_PREV">
        </command>-->
    </pushbutton>
    <pushbutton name="COMBOBOX_NEXT_BUTTON" position="ScrollDown" style="/plotterdoc/appearance/BW_0006_001" repeat="false">
        <!--<command name="EVENT_NEXT">
        </command>-->
    </pushbutton>
</pulldownlist>
</layout>
```

```
<function name="PD_STAPLE" resource="" displayname="" description="" available="true" relocatable="true">
  <function name="Staple_Off" resource="Item_Staple_Off.xml" displayname="" description="" available="true" relocatable="true" order=""/>        1351-1
  <function name="Staple_LeftTop" resource="Item_Staple_LeftTop.xml" displayname="" description="" available="" relocatable="" order=""/>        1351-2
  <function name="Staple_LeftBottom" resource="Item_Staple_LeftBottom.xml" displayname="" description="" available="" relocatable="" order=""/>  1351-3
  <function name="Staple_RightTop" resource="Item_Staple_RightTop.xml" displayname="" description="" available="" relocatable="" order=""/>      1351-4
  <function name="Staple_RightBottom" resource="Item_Staple_RightBottom.xml" displayname="" description="" available="" relocatable="" order=""/>1351-5
  <function name="Staple_TopBoth" resource="Item_Staple_TopBoth.xml" displayname="" description="" available="" relocatable="" order=""/>        1351-6
  <function name="Staple_LeftBoth" resource="Item_Staple_LeftBoth.xml" displayname="" description="" available="" relocatable="" order=""/>      1351-7
  <function name="Staple_RightBoth" resource="Item_Staple_RightBoth.xml" displayname="" description="" available="" relocatable="" order=""/>    1351-8
  <function name="Staple_LeftSalent" resource="Item_Staple_LeftSalent.xml" displayname="" description="" available="" relocatable="" order=""/>  1351-9
  <function name="Staple_RightSalent" resource="Item_Staple_RightSalent.xml" displayname="" description="" available="" relocatable="" order=""/>1351-10
  <function name="Staple_CenterBoth" resource="Item_Staple_CenterBoth.xml" displayname="" description="" available="" relocatable="" order=""/>  1351-11
</function>
```

135

DISPLAY CONTROL APPARATUS, DISPLAY CONTROL METHOD, AND COMPUTER-READABLE RECORDING MEDIUM STORING DISPLAY CONTROL PROGRAM

BACKGROUND OF THE INVENTION

1. Field of the Invention

The present invention generally relates to a display control apparatus, a display control method, and a computer-readable recording medium storing a display control program in which an operating screen is displayed on an operating panel of the apparatus.

2. Description of the Related Art

Recently, in image forming apparatuses (display control apparatus) such as a copying machine and an MFP (multi-functional peripheral), multiple functions have been installed. The number of buttons to be displayed on an operating panel has been increased corresponding to the multiple functions of the image forming apparatus. However, the displaying region of the operating panel of the image forming apparatus is smaller than that of a PC (personal computer), an ATM (automatic teller machine), and so on; consequently, many buttons cannot be displayed on the operating panel of the image forming apparatus. In order to solve the above problem, a user interface corresponding to the multiple functions of the image forming apparatus has been realized by using a multiple-layered operating screen on the operating panel. For example, when a button is pushed on an operating screen of the operating panel, another operating screen is displayed on the operating panel so that detailed information can be input on the operating panel (for example, in Patent Document 1).

[Patent Document 1] Japanese Laid-Open Patent Application No. 2006-505025

However, when the multiple-layered operating screen is used, the number of input steps is increased from selecting a function to starting the function (pushing a start button of the function). When the number of the input steps is increased, the operating time is increased and this bothers the user. Especially, when a user operates an image forming apparatus which is used in common by many users in an office, another user must wait for his/her job until the user finishes the current job and the user feels a psychological burden.

SUMMARY OF THE INVENTION

In a preferred embodiment of the present invention, there is provided a display control apparatus, a display control method, and a computer-readable recording medium storing a display control program in which operability of an operating screen by a user is increased.

Features and advantages of the present invention are set forth in the description that follows, and in part will become apparent from the description and the accompanying drawings, or may be learned by practice of the invention according to the teachings provided in the description. Features and advantages of the present invention will be realized and attained by a display control apparatus, a display control method, and a computer-readable recording medium storing a display control program particularly pointed out in the specification in such full, clear, concise, and exact terms so as to enable a person having ordinary skill in the art to practice the invention.

To achieve one or more of these and other advantages, according to one aspect of the present invention, there is provided a display control apparatus. The display control apparatus includes a number of items determining unit which determines the number of selection items to be simultaneously displayed in an item selection list on an operating screen based on a selection of a button on the operating screen, a position determining unit which determines an upper end position of the item selection list on the operating screen to be a position so that a part of the selection items in the item selection list is displayed in a direction inverse to a normal extending direction of the selection item list with a position of the selected button as a reference based on a comparison of the number of the selection items to be simultaneously displayed with the displayable number of selection items on the operating screen, and a generating unit which generates the item selection list on the operating screen based on the determined position.

[Effect of the Invention]

According to an embodiment of the present invention, in a display control apparatus, when a button is selected on an operating screen, an item selection list having selection items to be selected is displayed. Therefore, the operability of the display control apparatus can be increased.

BRIEF DESCRIPTION OF THE DRAWINGS

Features and advantages of the present invention will become more apparent from the following detailed description when read in conjunction with the accompanying drawings, in which:

FIG. 14 is a diagram showing transition screen information of a pull-down list;

FIG. 15 is a diagram showing an example of function information of the pull-down list;

FIG. 16 is a diagram showing function detail information of a third selection item shown in FIG. 15;

FIG. 24 is a diagram showing an operating screen when a scroll item is displayed in a pull-down list;

FIG. 25 is a diagram showing transition screen information of the pull-down list shown in FIG. 24;

FIG. 26 is a diagram showing function information of the pull-down list shown in FIG. 24;

DESCRIPTION OF THE PREFERRED EMBODIMENT

[Best Mode Of Carrying Out The Invention]

The best mode of carrying out the present invention is described with reference to the accompanying drawings.

Figure 1:
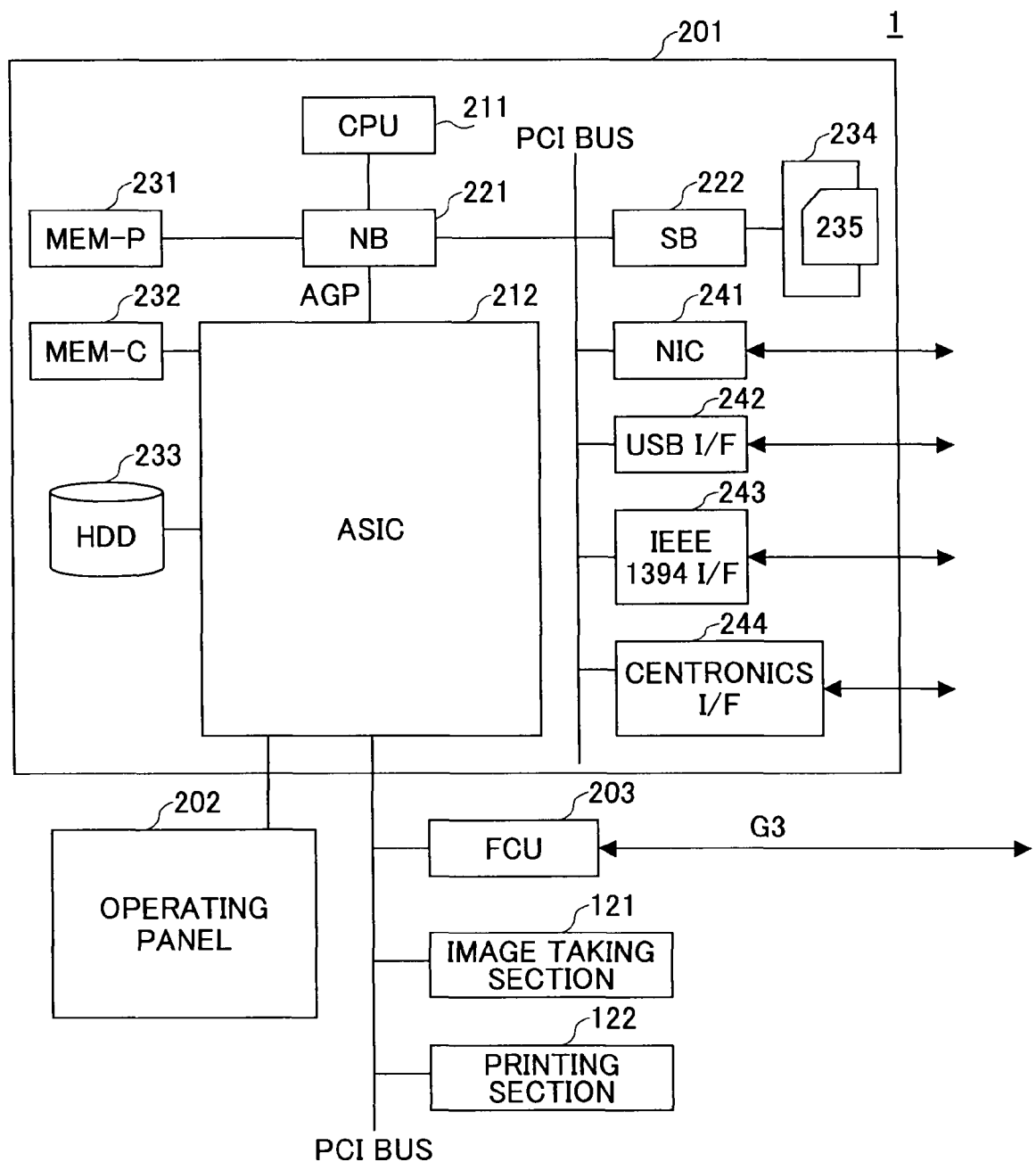
FIG. 1 is a diagram showing a hardware structure of a display control apparatus according to an embodiment of the present invention.

FIG. 1 is a diagram showing a hardware structure of a display control apparatus according to an embodiment of the present invention. In the embodiment of the present invention, an image forming apparatus is used as the display control apparatus. In FIG. 1, as the image forming apparatus, an MFP is shown.

As shown in FIG. 1, an MFP 1 includes a controller 201, an operating panel 202, an FCU (facsimile control unit) 203, an image taking section 121, and a printing section 122.

The controller 201 includes a CPU (central processing unit) 211, an ASIC (application specific integrated circuit) 212, an NB (north bridge) 221, an SB (south bridge) 222, an MEM-P 231, an MEM-C 232, an HDD (hard disk drive) 233, a memory card slot 234, a NIC (network interface controller) 241, a USB I/F (interface) 242, an IEEE 1394 I/F 243, and a Centronics I/F 244.

The CPU 211 controls all the elements in the controller 201. The ASIC 212 executes various image processes. The MEM-P 231 is a system memory unit of the MFP 1. The MEM-C 232 is a local memory unit of the MFP 1. A memory card 235 is inserted into the memory card slot 234. The NIC 241 controls network communications by using an MAC (media access control) address.

The USB I/F 242 connects the MFP 1 to an external USB terminal. The IEEE 1394 I/F 243 connects the MFP 1 to an external IEEE 1394 terminal. The Centronics I/F 244 connects the MFP 1 to an external Centronics terminal. A user inputs an instruction on the operating panel 202 and the result is displayed on the operating panel 202.

Figure 2:
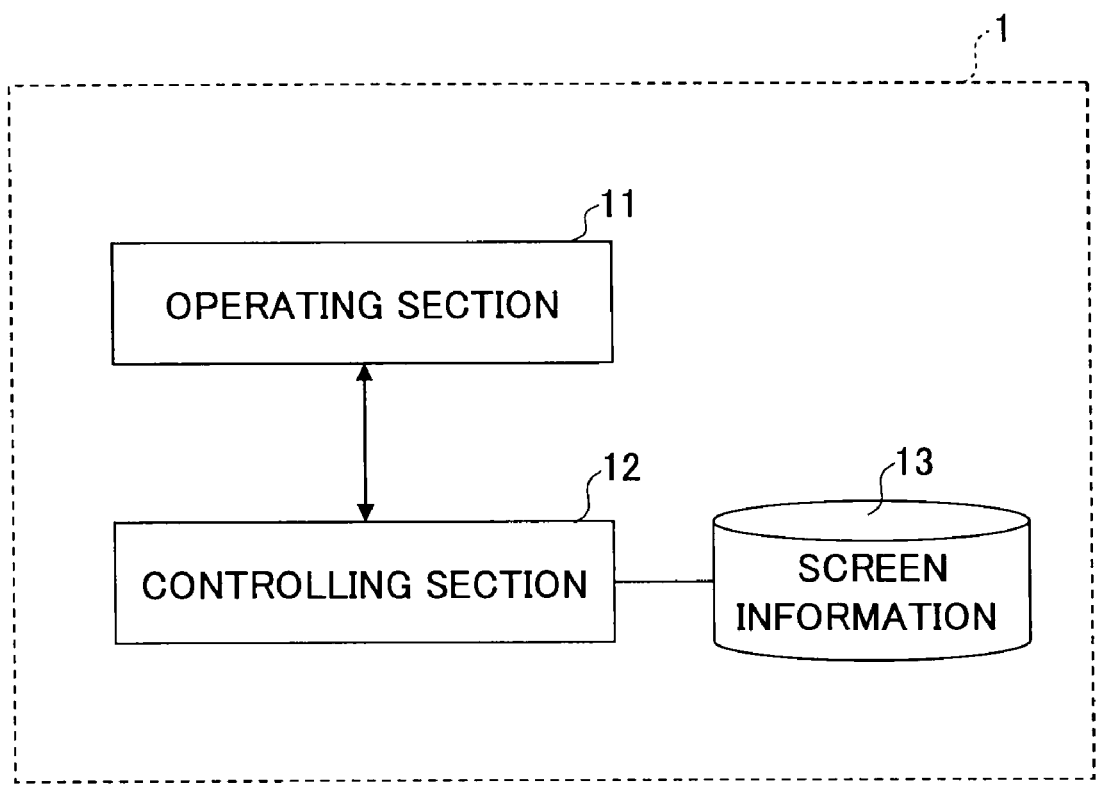
FIG. 2 is a diagram showing a software structure of the display control apparatus shown in FIG. 1.

FIG. 2 is a diagram showing a software structure of the display control apparatus according to the embodiment of the present invention. As described above, in the embodiment of the present invention, the MFP 1 is used as the display control apparatus. The MFP 1 includes an operating section 11, a controlling section 12, and screen information 13.

The operating section 11 controls displaying an operating screen on a displaying region (touch panel) of the operating panel 202. For example, the operating section 11 calculates a displaying position of the operating screen in the displaying region and displays the operating screen at the calculated displaying position.

The controlling section 12 controls a transition of operating screens based on operations of a user on the operating panel 202. For example, the controlling section 12 determines a screen to be displayed corresponding to a selection of a button on an operating screen and instructs the operating section 11 to display the determined operating screen.

In the screen information 13, information is defined for generating operating screens, and the screen information 13 is stored in, for example, the HDD 233.

The operating section 11 and the controlling section 12 are realized when the CPU 211 executes a program stored in the MEM-P 231 or the MEM-C 232.

The MFP 1 displays a pull-down list (item selection list) on an operating screen of the operating panel 202. The pull-down list is a menu type window having one or more selection items to be displayed on the operating screen when a button is selected on the operating screen. The pull-down list includes a pull-down menu, a context menu, and a list box (list type window) when a combo box is used.

Figure 3:
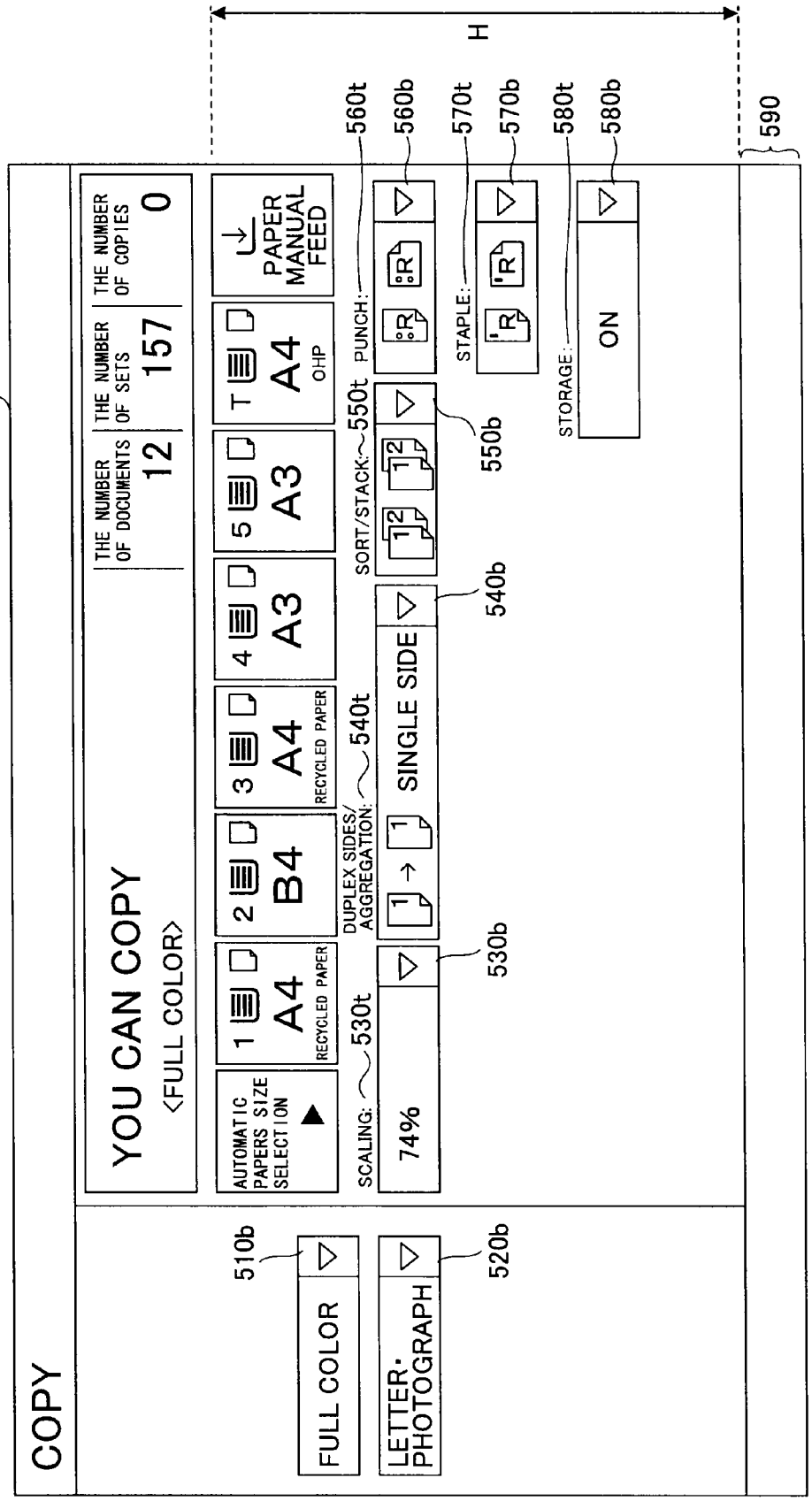
FIG. 3 is a diagram showing an operating screen for describing operations of a pull-down list according to the embodiment of the present invention.

Next, operations of the pull-down list are described. FIG. 3 is a diagram showing an operating screen for describing the operations of the pull-down list according to the embodiment of the present invention. In the embodiment of the present invention, the up and down directions and the right and left directions on the operating screen are directions for a user who faces the operating screen.

In FIG. 3, A4 signifies the size of paper of 210 mm×297 mm, A3 signifies the size of paper of 297 mm×420 mm, and B4 signifies the size of paper of 257 mm×364 mm.

In an operating screen 500 shown in FIG. 3, when pull-down buttons 510*b*, 520*b*, 530*b*, 540*b*, 550*b*, 560*b*, 570*b*, and 580*b* are pushed (selected), corresponding pull-down lists are displayed on the operating screen 500. In addition, the pull-down buttons 530*b*, 540*b*, 550*b*, 560*b*, 570*b*, and 580*b* have corresponding titles 530*t*, 540*t*, 550*t*, 560*t*, 570*t*, and 580*t* above the pull-down buttons. The title is a character string which simply shows the name of a pull-down list. In FIG. 3, status information, for example, a log-in user name, a system status, and a message for the user, is displayed on a status displaying area 590.

Figure 4:
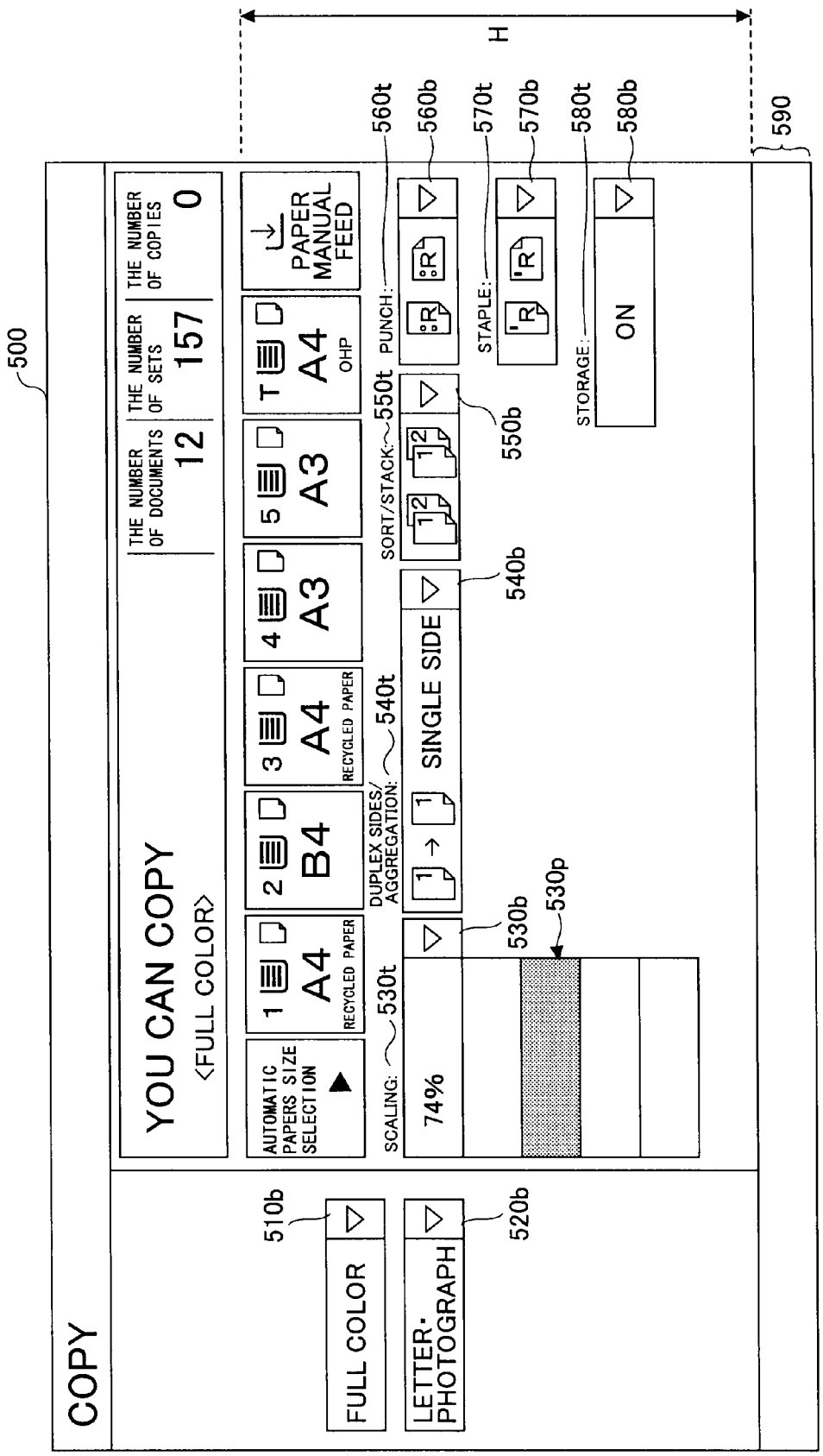
FIG. 4 is a first operating diagram showing the operating screen for describing the operations of the pull-down list according to the embodiment of the present invention.

Referring to FIGS. 4 through 10, the operations of the pull-down list are described in detail. FIG. 4 is a first operating diagram showing the operating screen for describing the operations of the pull-down list according to the embodiment of the present invention.

As shown in FIG. 4, as an example, when the pull-down button 530*b* is selected, a pull-down list 530*p* is displayed under the pull-down button 530*b*. In the embodiment of the present invention, basically, the pull-down list is displayed under the pull-down button. The height (the length in the vertical direction) of the pull-down list is determined by the number of items to be selected (the number of selection items). In FIG. 4, as an example, the pull-down list 530*p* includes four selection items.

In the embodiment of the present invention, the pull-down list is displayed in a displayable range H shown in FIG. 4. If the pull-down list is displayed over the displayable range H, the status displaying area 590 is obscured by the pull-down list. Consequently, the operability is decreased. Therefore, the displayable range H is determined.

Figure 5:
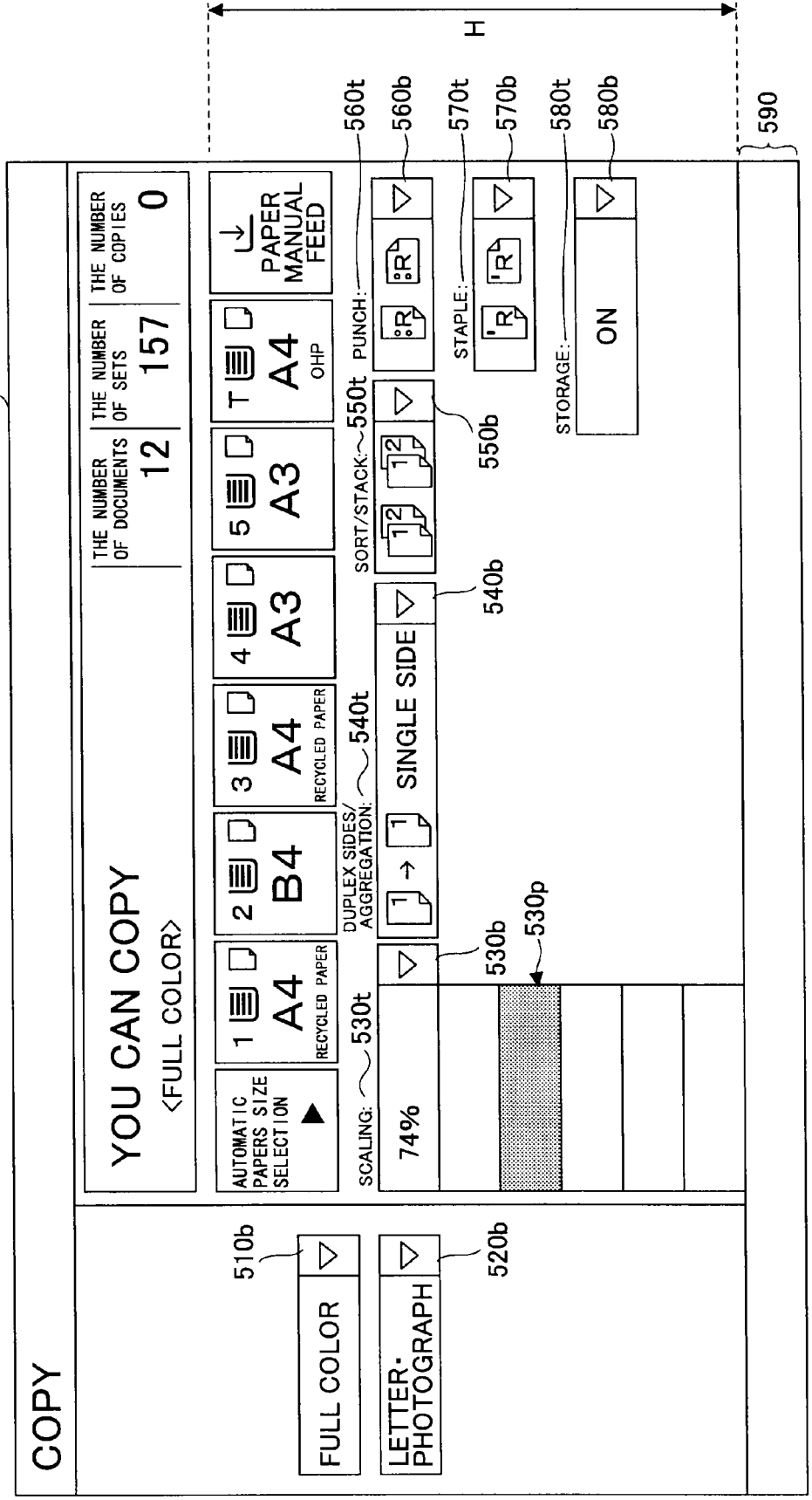
FIG. 5 is a second operating diagram showing the operating screen for describing the operations of the pull-down list according to the embodiment of the present invention.

FIG. 5 is a second operating diagram showing the operating screen for describing the operations of the pull-down list according to the embodiment of the present invention.

As shown in FIG. 5, even if the number of the selection items of the pull-down list 530*p* is increased to five, when the lower end of the pull-down list 530*p* does not overlap the status displaying area 590, the pull-down list 530*p* having the five selection items is displayed in the downward direction.

However, in FIG. 5, when the number of the selection items of the pull-down list 530*p* is increased to six or more, the lower end of the pull-down list 530*p* overlaps the status displaying area 590. That is, the pull-down list 530*p* exceeds the lower end of the displayable range H. In this case, it can be assumed that the displayable number of the selection items at the same time is determined to be five and the selection items on and after the sixth selection item are displayed by scrolling.

Figure 6:
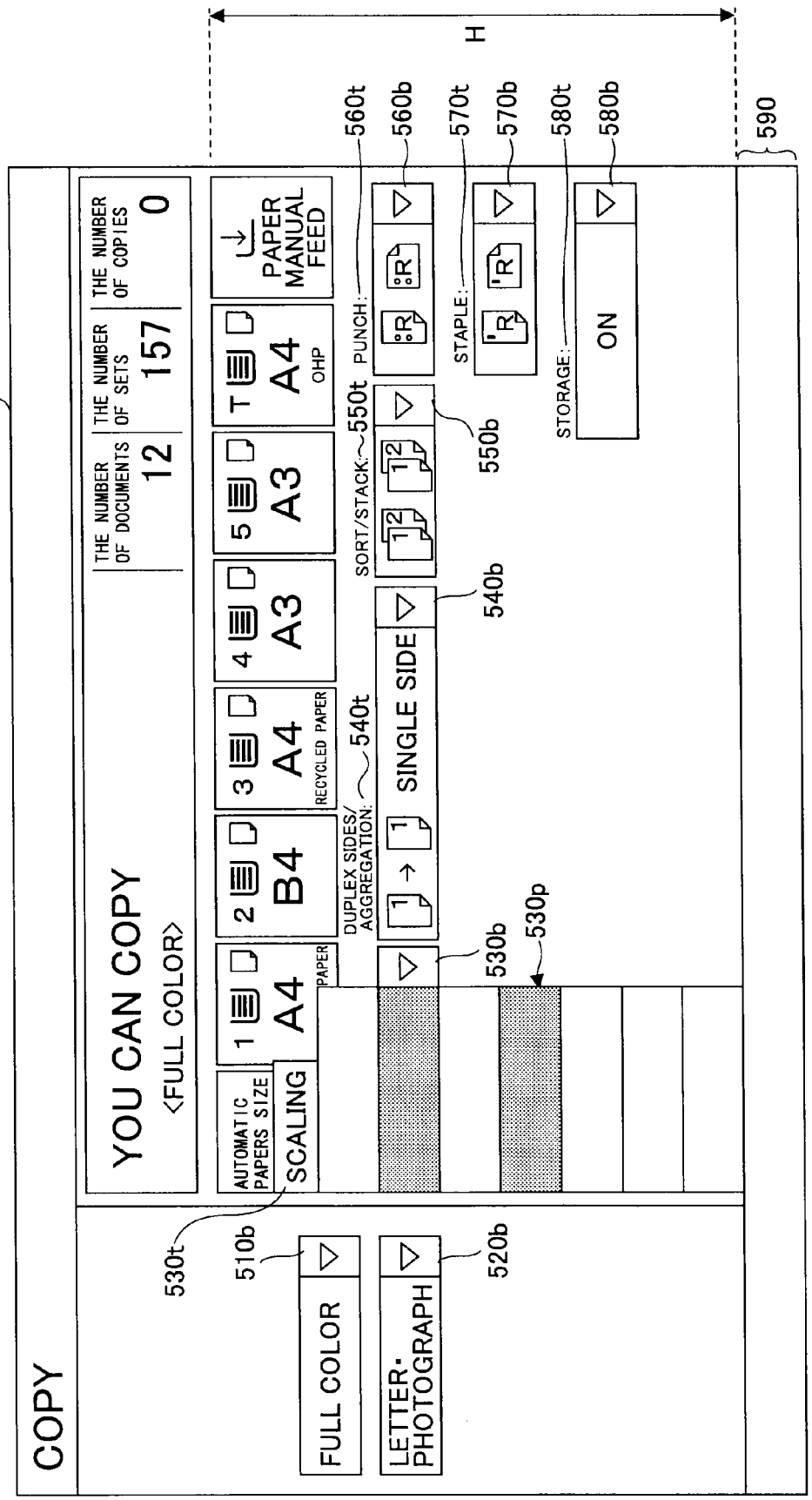
FIG. 6 is a third operating diagram showing the operating screen for describing the operations of the pull-down list according to the embodiment of the present invention.

FIG. 6 is a third operating diagram showing the operating screen for describing the operations of the pull-down list according to the embodiment of the present invention.

In the embodiment of the present invention, as shown in FIG. 6, when the number of the selection items of the pull-down list 530*p* is increased to six or more, the displaying position of the pull-down list 530*p* can be extended in the upward direction. With this, a user interface having high operability can be realized without scrolling operations. However, when the pull-down list 530*p* is extended in the upward direction, the upper part of the pull-down list 530*p* overlaps the title 530*t* and the title 530*t* cannot be displayed. In order to solve the above problem, the displaying position of the title 530*t* is shifted to an upper position so that the pull-down list 530*p* does not overlap the title 530*t* corresponding to the shift of the pull-down list 530*p*. In FIG. 6, the title 530*t* is shifted to a position above the pull-down list 530*p*. With this, all the selection items of the pull-down list 530*p* can be displayed.

Figure 7:
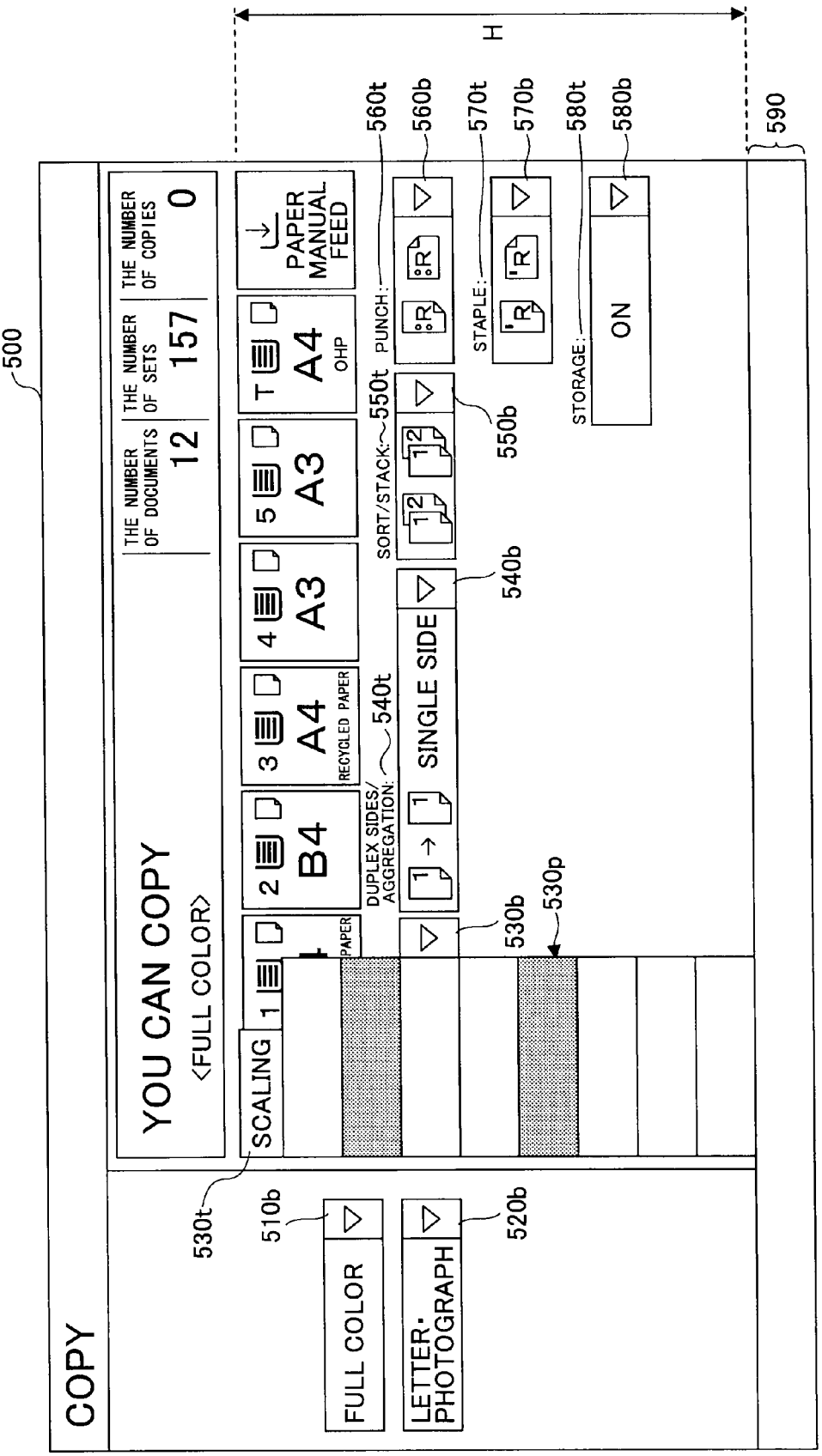
FIG. 7 is a fourth operating diagram showing the operating screen for describing the operations of the pull-down list according to the embodiment of the present invention.

FIG. 7 is a fourth operating diagram showing the operating screen for describing the operations of the pull-down list according to the embodiment of the present invention.

In a case where the number of the selection items is further increased, as shown in FIG. 7, when the sum of the heights of the title 530*t* and the pull-down list 530*p* is within the displayable range H, all the selection items can be displayed at the same time by moving the displaying position of the pull-down list 530*p* in the upward direction by the increment of the selection items.

Figure 8:
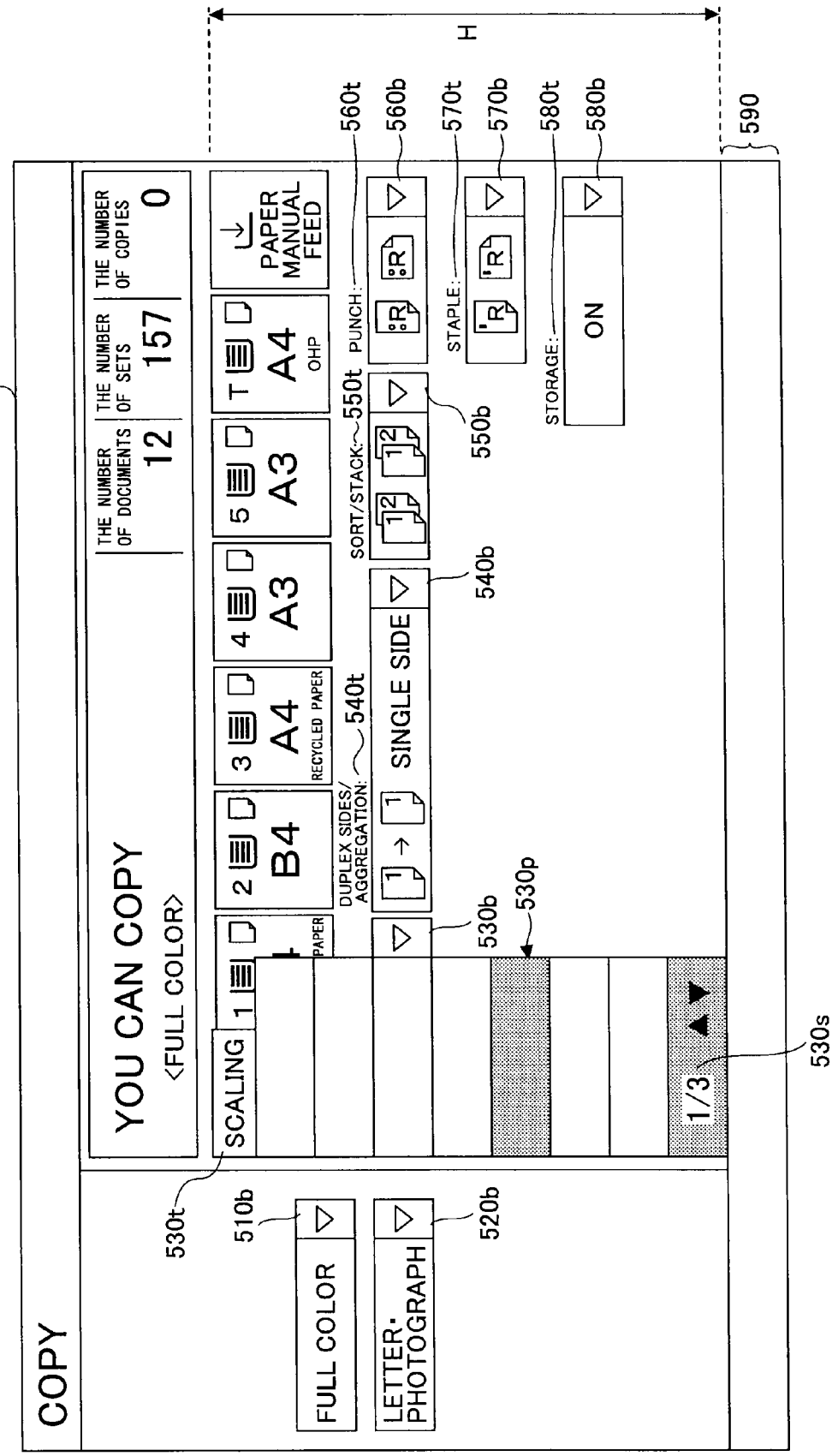
FIG. 8 is a fifth operating diagram showing the operating screen for describing the operations of the pull-down list according to the embodiment of the present invention.

FIG. 8 is a fifth operating diagram showing the operating screen for describing the operations of the pull-down list according to the embodiment of the present invention.

When the number of selection items in the pull-down list 530*p* is increased to exceed the displayable range H, as shown in FIG. 8, a scroll item 530*s* is displayed at a part of the pull-down list 530*p*. In the pull-down list 530*p* of FIG. 8, the lowest region of the pull-down list 530*p* is used as a region where the scroll item 530*s* is displayed. When the arrow in the scroll item 530*s* is pushed (touched), the pull-down list 530*p* is changed from page to page.

Figure 9:
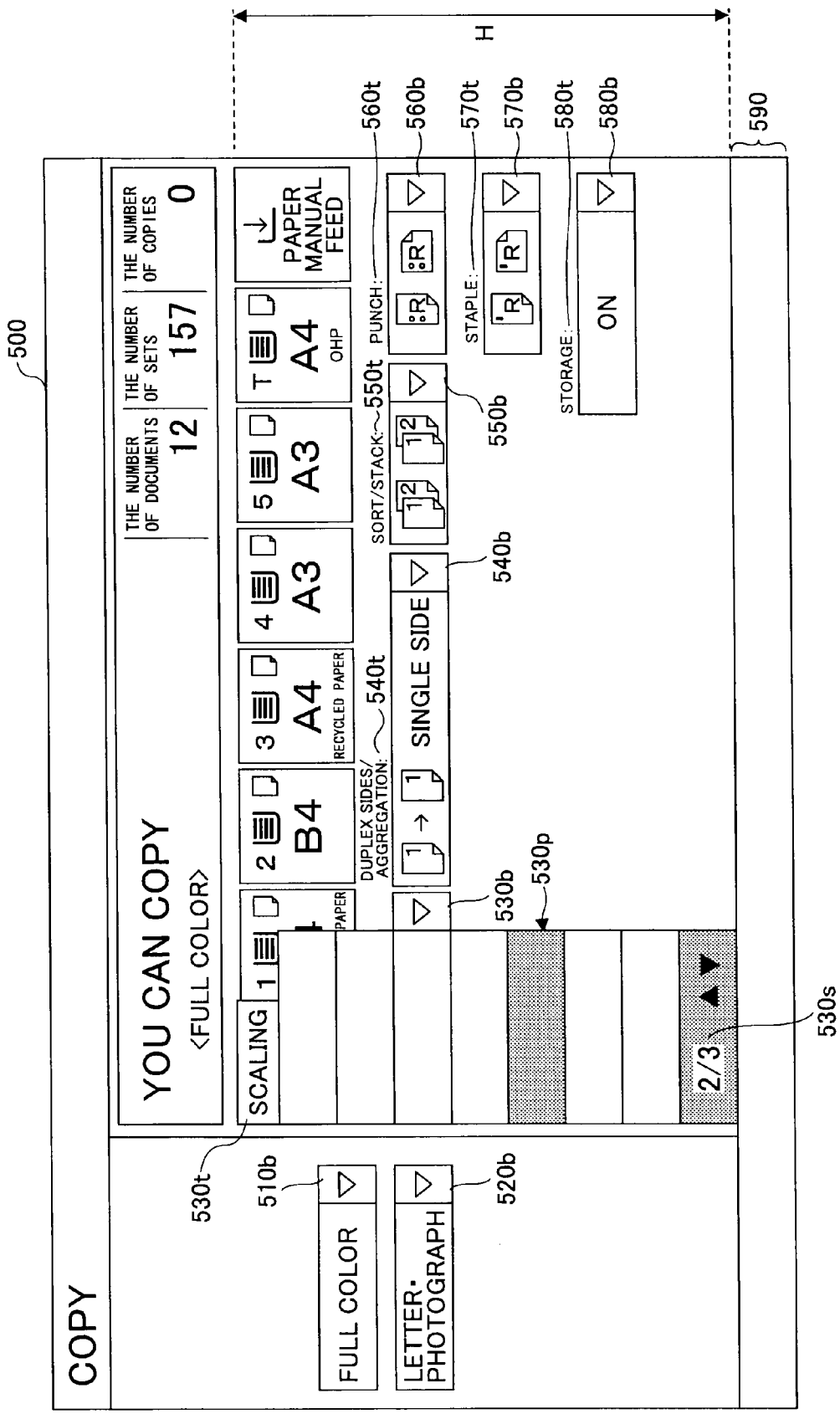
FIG. 9 is a sixth operating diagram showing the operating screen for describing the operations of the pull-down list according to the embodiment of the present invention.

In FIG. 8, for example, the first page in three pages of the pull-down list 530*p* is displayed. In FIG. 9, the second page in the three pages of the pull-down list 530*p* is displayed, and in FIG. 10, the third page in the three pages of the pull-down list 530*p* is displayed. When the number of the selection items is less than the maximum number in the displayable range H in the last page, a blank item(s) can be displayed in the pull-down list 530*p*. In addition, the height of the pull-down list 530*p* in the last page can be reduced.

Figure 10:
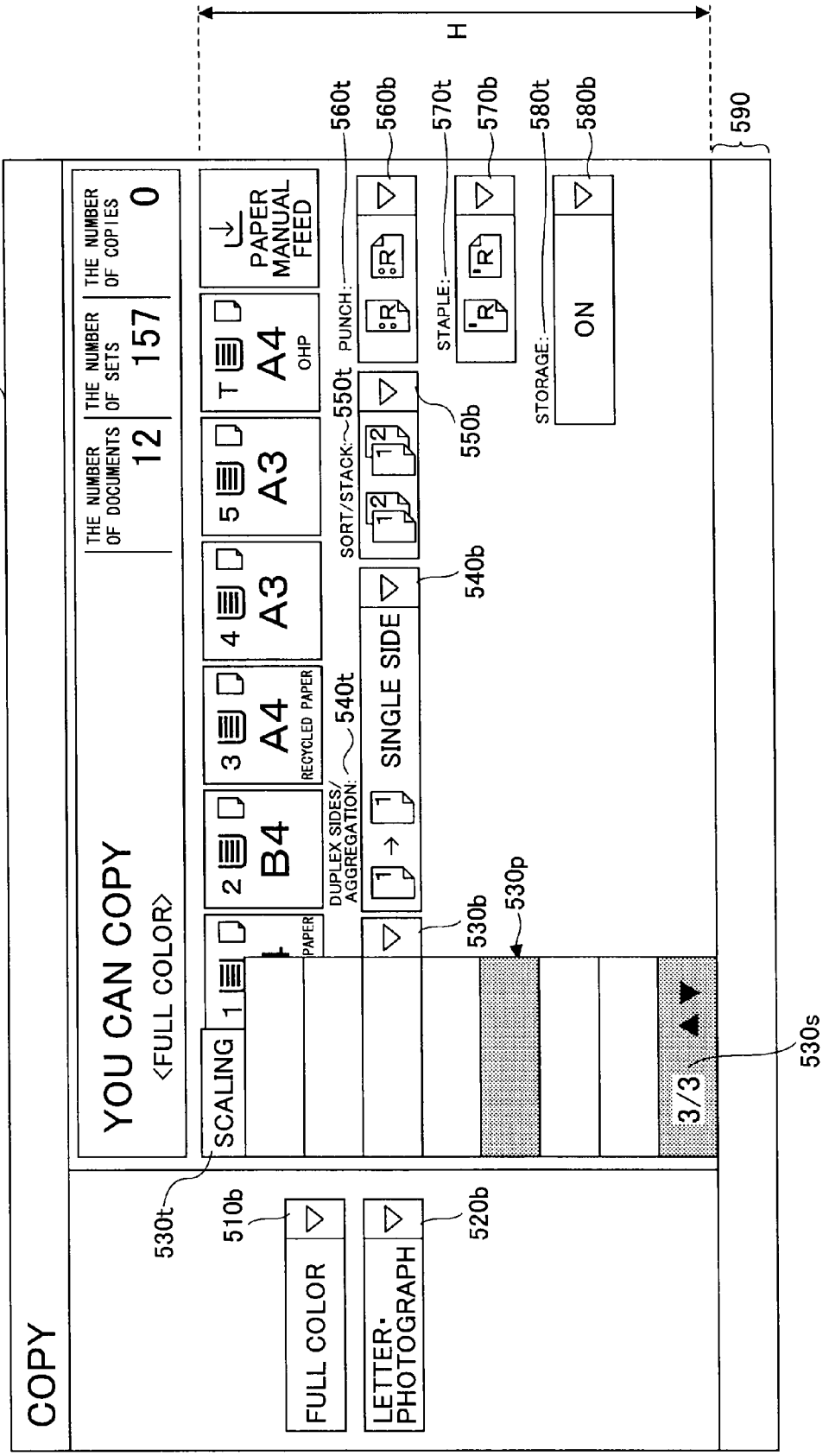
FIG. 10 is a seventh operating diagram showing the operating screen for describing the operations of the pull-down list according to the embodiment of the present invention.

FIG. 9 is a sixth operating diagram showing the operating screen for describing the operations of the pull-down list according to the embodiment of the present invention. FIG. 10 is a seventh operating diagram showing the operating screen for describing the operations of the pull-down list according to the embodiment of the present invention.

In the above pull-down list 530*p*, the selection items are scrolled page by page; however, the selection items can be scrolled item by item.

Figure 11:
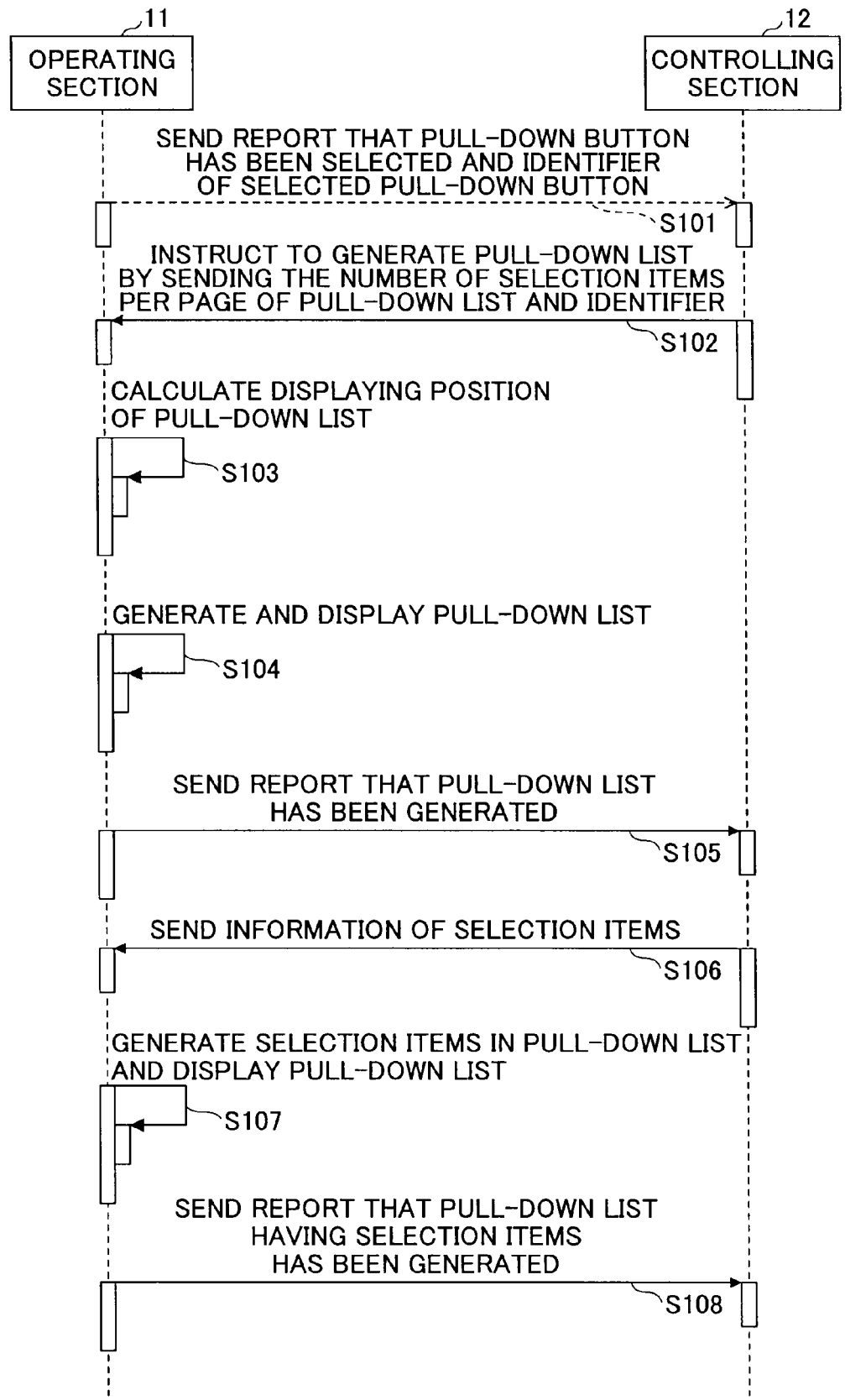
FIG. 11 is a sequence chart showing processes to generate a pull-down list according to the embodiment of the present invention.

Next, processes in the MFP 1 are described in which the operations of the pull-down list 530*p* are realized. FIG. 11 is a sequence chart showing processes to generate a pull-down list.

First, when a pull-down button is selected (pushed) on the operating screen 500 of the operating panel 202, the operating section 11 sends a report that the pull-down button has been selected with an identifier (ID) of the selected pull-down button to the controlling section 12 (S101). The controlling section 12 determines a pull-down list to be generated based on the identifier of the selected pull-down button as a new window to be displayed, and determines the number of selection items per page of the pull-down list, and sends the determined results with the identifier to the operating section 11 (S102). That is, the controlling section 12 instructs the operating section 11 to generate the pull-down list in S102. In this, the number of selection items per page signifies that the selection items are displayed at the same time. Since the operating section 11 has not held the identifier, the controlling section 12 sends the identifier together with the determined results.

The operating section 11 calculates (determines) the displaying position (coordinates) of the pull-down list based on the number of the selection items per page (S103). The displaying position is determined so that the operations of the pull-down list shown in FIGS. 4 through 10 are realized. The operating section 11 generates the pull-down list based on the determined displaying position and the number of the selection items per page, and displays the pull-down list (S104). The generated pull-down list is displayed on the operating screen 500 of the operating panel 202 at the determined position. At this time, the selection items in the pull-down list have not been generated. The operating section 11 sends a report that the pull-down list has been generated to the controlling section 12 (S105). The controlling section 12 stores information that the pull-down list is being displayed in a memory unit, for example, the HDD 233.

The controlling section 12 determines information of selection items (ID (identifier) of each item, a displaying character string of each item, a displaying position of the displaying character string, and so on) based on the screen information 13, and sends the determined results (information) to the operating section 11 (S106).

The operating section 11 generates the selection items on the pull-down list based on the information received from the controlling section 12, and displays the pull-down list having the selection items (S107). If necessary, at this time, a scroll item is generated. When the selection items are generated, the selection items are listed on the pull-down list. The operating section 11 sends a report that the pull-down list having the selection items has been generated to the controlling section 12 (S108).

In the above, the generated pull-down list is displayed in S104 and S107; however, it is possible that the generated pull-down list is not displayed in S104 and S107. In this case, in S104 and S107, the pull-down list is only generated, and when the MFP 1 receives an instruction to display the generated pull-down list, the pull-down list is displayed.

Figure 12:
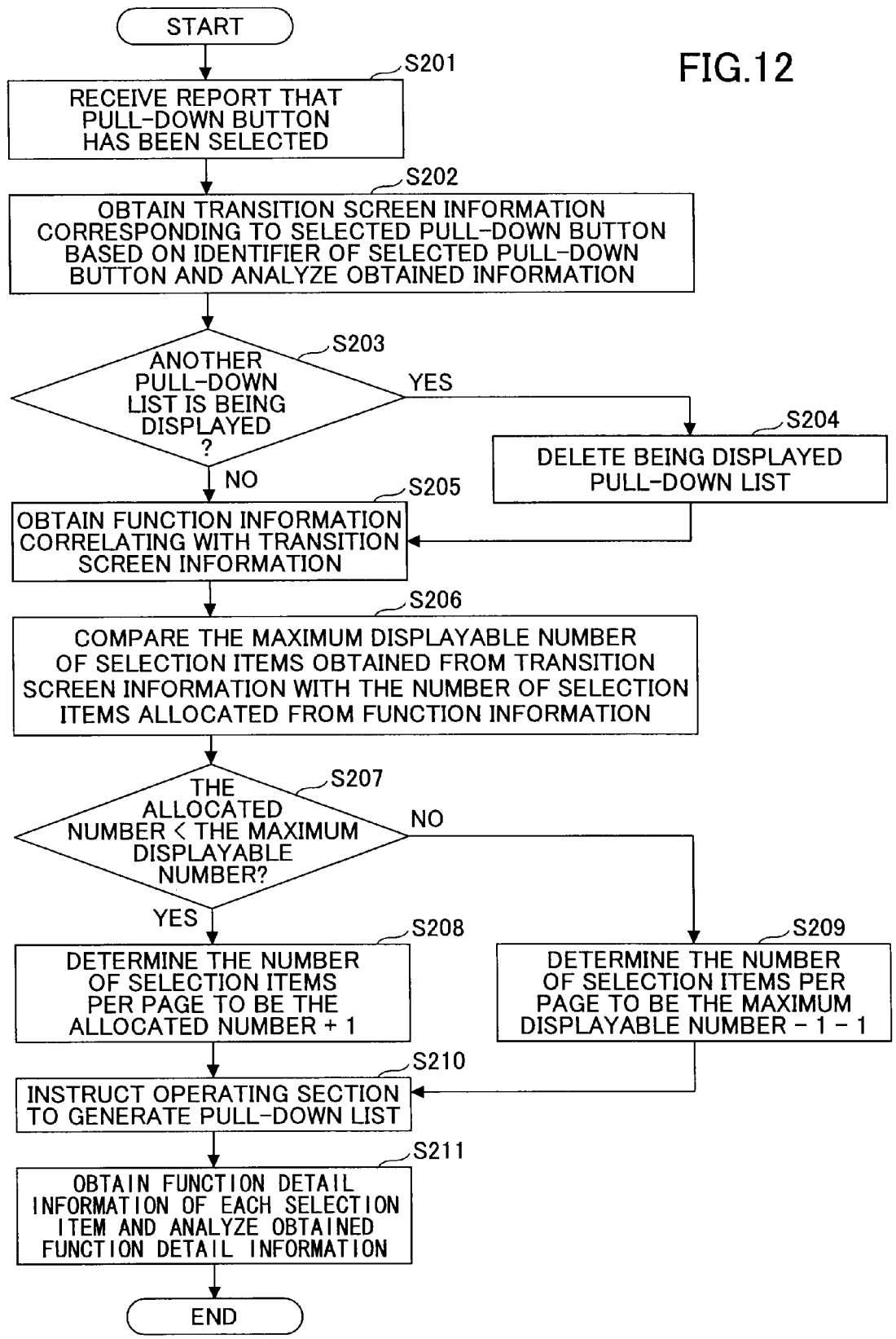
FIG. 12 is a flowchart showing processes when a controlling section determines the number of selection items per page of the pull-down list.

Next, processes in S102 shown in FIG. 11 by the controlling section 12 are described when the controlling section 12 determines the number of the selection items per page of the pull-down list. FIG. 12 is a flowchart showing processes when the controlling section 12 determines the number of the selection items per page of the pull-down list.

First, the controlling section 12 receives a report that a pull-down button has been selected from the operating section 11 (S201). This process corresponds to the process in S101 of FIG. 11. That is, the controlling section 12 receives the identifier of the selected pull-down button.

Next, the controlling section 12 obtains transition screen information corresponding to the selected pull-down button based on the identifier of the selected pull-down button and analyzes the information (S202). In the transition screen information, a layout of a screen to be changed (transitioned) from a current screen based on an instruction on the current screen is defined on an operating screen. The transition screen information is a part of the screen information 13. The transition screen information is stored by being correlated with the identifier of the selected pull-down button in, for example, the HDD 233.

Figure 13:
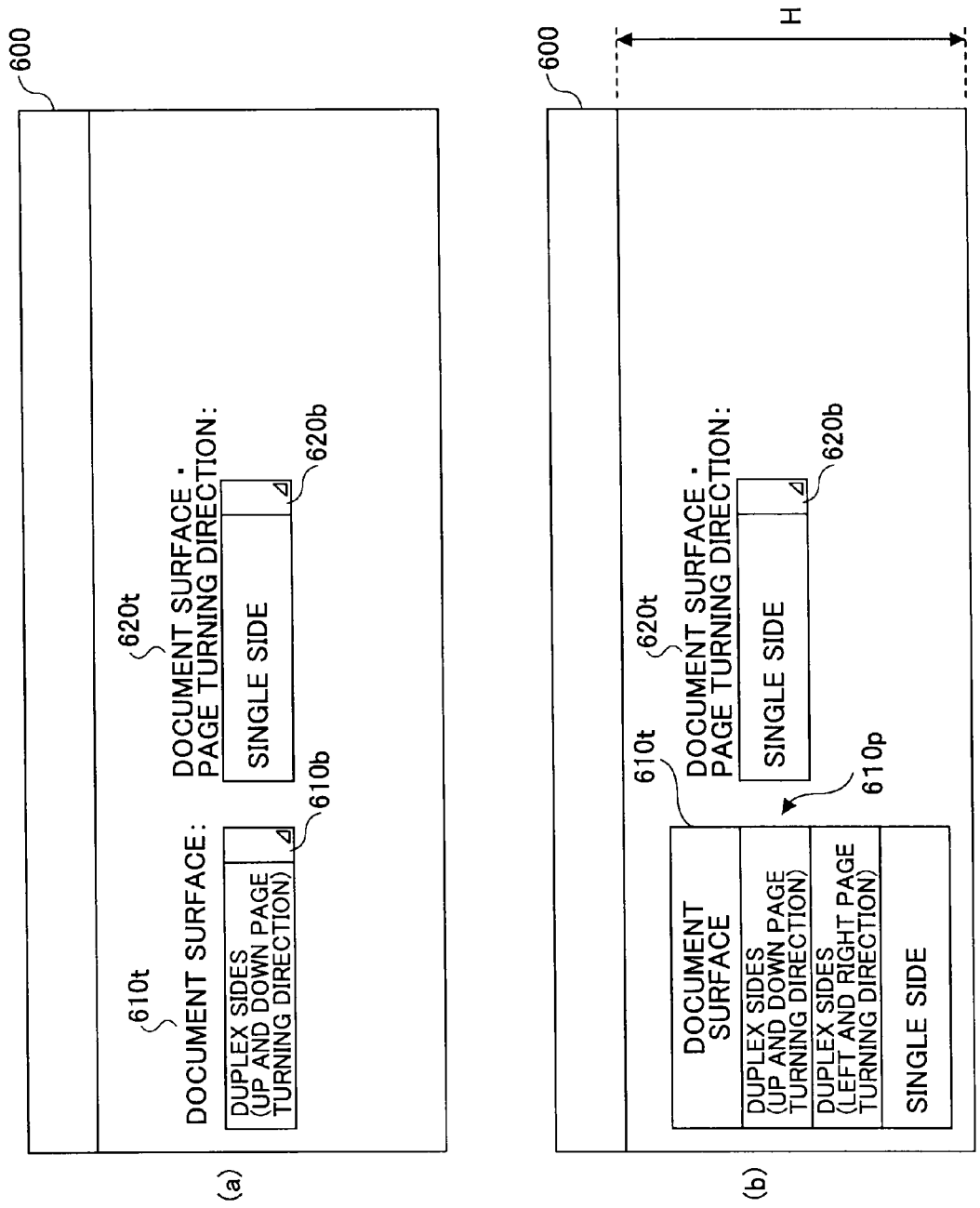
FIG. 13 is a diagram showing an operating screen for describing screen information shown in FIG. 2.

The screen information 13 is described based on an operating screen shown in FIG. 13. FIG. 13 is a diagram showing an operating screen 600 for describing the screen information 13.

In FIG. 13(a), pull-down buttons 610b and 620b are displayed on the operating screen 600. In addition, a title 610t of the pull-down button 610b and a title 620t of the pull-down button 620b are displayed. When the pull-down button 610b is selected, a pull-down list 610p shown in FIG. 13(b) is displayed. That is, a transition screen changed from the screen shown in FIG. 13(a) is the screen shown in FIG. 13(b) when the pull-down button 610b is selected. That is, in the changed screen shown in FIG. 13(b), the pull-down list 610p is displayed. In FIG. 13(b), the displayable range H of the pull-down list 610p is shown. That is, as described above, the transition screen information is a part of the screen information 13.

The transition screen information correlated with the pull-down button 610b (that is, the information of the structure of the pull-down list 610p) is defined as follows. FIG. 14 is a diagram showing transition screen information 131 of the pull-down list 610p. In FIG. 14, the transition screen information 131 (first definition information) is described in an XML format. In XML, data between tags are called an element.

In the transition screen information 131 shown in FIG. 14, a layout element is defined as a root element. A value "PDTemplate2" of a name attribute 1312 of the layout element shows an identifier (ID) of a screen layout defined in the transition screen information 131.

A screen type is defined by a sub-element of the layout element. In the transition screen information 131, a pull-down list element 1311 is a sub-element of the layout element. Therefore, the transition screen is recognized as a pull-down list. A value "PLOTTER_DOC_PAPER_FACE" of a content attribute 1313 in the pull-down list element 1311 is an ID of function information in which selection items to be allocated in the pull-down list are defined. The function information is described below.

The pull-down list element 1311 includes list item elements 1313-1 through 1313-5, an icon element 1314, a text element 1315, push button elements 1316 and 1317, and an icon element 1318 as sub-elements.

The list item elements 1313-1 through 1313-5 define a layout of the selection items. In more detail, the number of the list item elements defines the maximum displayable number of the selection items at the same time in the displayable range H. In FIG. 14, since the five list item elements 1313-1 through 1313-5 are described, the maximum displayable number of the selection items is five in the displayable range H.

In the transition screen information 131, the selection items to be actually allocated in the pull-down list are not defined. That is, for example, three selection items shown in FIG. 13(b) are not defined. The selection items to be actually allocated in the pull-down list are defined by the function information. The maximum displayable number of the selection items is determined by the displayable range H and the corresponding heights of the selection items when the screen layout is designed. However, in this case, the height of the title must be considered and the maximum displayable number of the selection items is determined by including the height of the title.

In the icon element 1314, image data to be displayed at a background of a header (a part where the title 610t shown in FIG. 13) of the pull-down list 610p are defined.

In the text element 1315, a character string "DocumentSurface" of the title 610t is defined.

In the push button elements 1316 and 1317, scroll items are defined. The push button element 1316 is used to turn pages and the push button element 1317 is used to return pages. However, as described in FIGS. 8 through 10, the scroll item is used only when it is required.

In the icon element 1318, image data to be displayed at a background of a footer (a part where the scroll item is displayed) of the pull-down list 610p are defined.

Returning to FIG. 12, the controlling section 12 determines whether a pull-down list is to be displayed based on the obtained transition screen information 131 or whether another pull-down list is being displayed when the pull-down list is to be displayed (S203). In the transition screen information 131, when a sub-element of the layout element is a pull-down list element, the controlling section 12 determines that the pull-down list is to be displayed. When another pull-down list is being displayed, since the controlling section 12 has stored the information in the HDD 233, the controlling section 12 can determine that based on the stored information.

When another pull-down list is being displayed (YES in S203), the controlling section 12 instructs the operating section 11 to delete the being displayed pull-down list (S204). With this, the being displayed pull-down list is deleted on the operating panel 202. In addition, the information that the pull-down list is being displayed is deleted in the HDD 233.

Next, the controlling section 12 obtains the function information correlated with the transition screen information 131 and analyzes the contents of the obtained function information (S205). In the function information, a selection item to be allocated to the pull-down list is defined. The function information is a part of the screen information 13, and is defined by being correlated with the transition screen information 131 and is stored in the HDD 233. For example, the function information (corresponding to the pull-down list 610*p* shown in FIG. 13) correlated with the transition screen information 131 shown in FIG. 14 is defined as follows.

FIG. 15 is a diagram showing an example of the function information. In FIG. 15, the function information is described in an XML format.

In function information 132 (second definition information), a function element is defined as a root element. A value "PLOTTER_DOC_PAPER_FACE" of a name attribute 1321 of the function element shows an identifier (ID) of the function information 132. This value is equal to the value "PLOTTER_DOC_PAPER_FACE" of the content attribute 1313 in the pull-down list element 1311 of the transition screen information 131. That is, the function information 132 is correlated with the transition screen information 131 by this value. Therefore, the controlling section 12 obtains the function information 132 in which the ID of the function information 132 is equal to the value of the content attribute 1313 of the pull-down list element 1311.

The function element includes function elements 1322-1 through 1322-3 as sub-elements. The function elements 1322-1 through 1322-3*b* are the corresponding selection items to be allocated into the pull-down list 610*p*. That is, one sub-function element corresponds to one selection item. In FIG. 15, three function elements are described. That is, the three function elements correspond to the three selection items in pull-down list 610*p* shown in FIG. 13(*b*).

In each of the function elements 1322-1 through 1322-3, a resource attribute is defined. A value of the resource attribute shows a file name in which function detail information of a selection item corresponding to the function element is stored. For example, the value of a resource attribute 1322-3*a* of the function element 1322-3 is "PullDownItem_SingleSide.xml". Therefore, the function detail information of the third selection item is stored in a file whose name is "PullDownItem_SingleSide.xml". The function detail information is described below in more detail.

Next, the controlling section 12 compares the maximum displayable number of the selection items obtained from the transition screen information 131 with the number of the selection items allocated from the function information 132 (S206). When the allocated number of the selection items is less than the maximum displayable number (YES in S207), the number of the selection items in the pull-down list 610*p* per page is determined to be the allocated number+1 (for the title 610*t*) (S208). When the allocated number of the selection items is the maximum displayable number or more (NO in S207), the number of the selection items in the pull-down list 610*p* per page is determined to be the maximum displayable number−1 (for the title 610*t*)−1 (for the scroll item) (S209). In this, when 1 is subtracted from the maximum displayable number, even if the scroll item is added, the pull-down list 610*p* can be displayed within the maximum displayable range H.

As described above, the number of the selection items per page is determined to be a value which includes the title.

Next, the controlling section 12 sends the information of the determined number of the selection items per page, the ID of the pull-down button 610*b*, the title 610*t*, the icon of the header, the icon of the footer, and the scroll item to the operating section 11 (S210). That is, the controlling section 12 instructs the operating section 11 to generate the pull-down list 610*p*. The process in S210 corresponds to the process in S102 shown in FIG. 11. The controlling section 12 obtains the function detail information of each selection item defined in the function information 132 based on the resource attribute of each function element and analyzes the contents of the obtained function detail information (S211).

In the function detail information, detailed information of each selection item is defined. The function detail information is a part of the screen information 13. For example, the function detail information of the third selection item shown in FIG. 15 is defined as follows.

FIG. 16 is a diagram showing the function detail information of the third selection item shown in FIG. 15. In FIG. 16, function detail information 133 is described in an XML format.

In the function detail information 133, a command element 1331 defines a command (process) to be executed when a selection item is selected. A text element 1332 defines a character string (item name) to be displayed corresponding to the selection item. In the text element 1332, a value "WID_PullDownItem_SingleSideText" of a name attribute 1322*a* is an identifier (ID) of the character string. A value "Pos2" of a position attribute 1332*b* is information to identify a position where the character string is displayed in the selection item. A value "SingleSide" of a text attribute 1332*c* is a character string to be displayed.

Based on the above function detail information, in the process of S211, the controlling section 12 holds the character string, the ID of the character string, and the position of the character string of each selection item in the pull-down list 610*p*.

Figure 17:
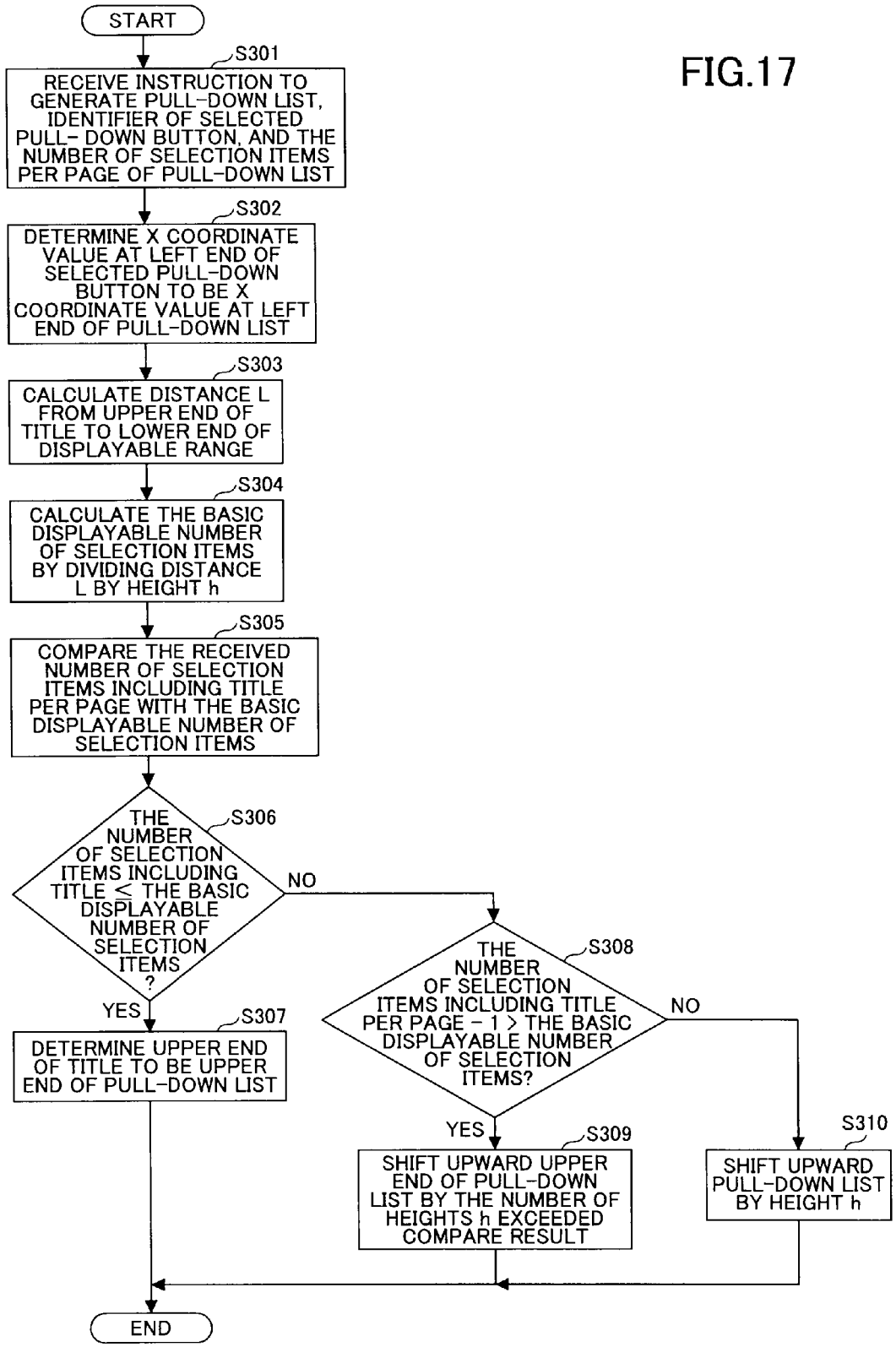
FIG. 17 is a flowchart showing processes when the operating section calculates a displaying position of the pull-down list.

Next, processes to be executed in S103 shown in FIG. 11 are described. FIG. 17 is a flowchart showing processes when the operating section 11 calculates a displaying position of the pull-down list.

First, the operating section 11 receives an instruction to generate a pull-down list, an ID of a selected pull-down button, and the number of selection items per page of the pull-down list from the controlling section 12 (S301). This process corresponds to the process in S102 shown in FIG. 11.

Next, the operating section 11 obtains an X coordinate value at the left end of the selected pull-down button based on the ID of the selected pull-down button, and determines the X coordinate value to be an X coordinate value at the left end of the pull-down list (S302).

Figure 18:
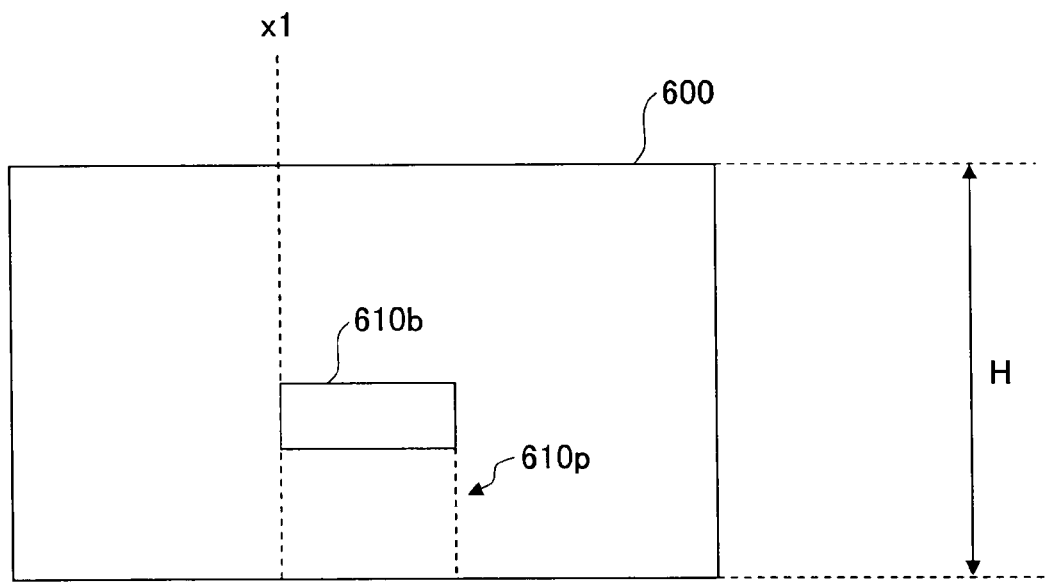
FIG. 18 is a diagram showing an X coordinate value in the operating screen shown in FIG. 13.

FIG. 18 is a diagram showing the X coordinate value in the operating screen 600. In the operating screen 600 shown in FIG. 18, an X coordinate value at the left end of the pull-down button 610*b* is "x1". Therefore, an X coordinate value at the left end of the pull-down list 610*p* is determined to be "x1". The operating section 11 manages structural elements such as buttons in the operating screen 600 by being correlated the ID of the button with attribute information of the button including a coordinate value and the size of the button.

Figure 19:
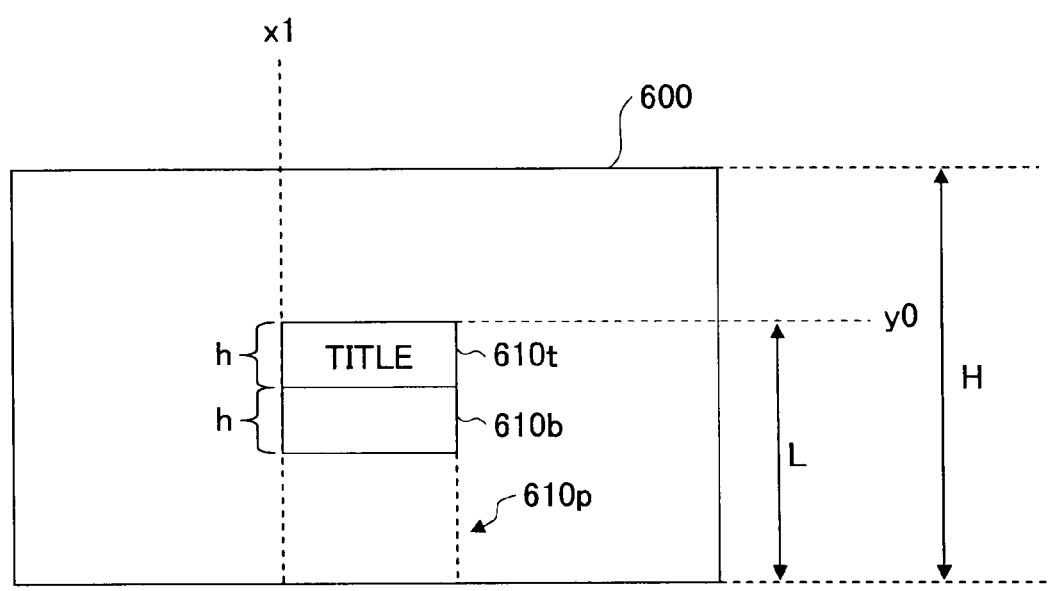
FIG. 19 is a diagram showing a distance from the upper end of a title to the lower end of a displayable range in the operating screen shown in FIG. 13.

FIG. 19 is a diagram showing a distance from the upper end of the title 610*t* to the lower end of the displayable range H.

As shown in FIG. 19, the operating section 11 calculates a distance L from the upper end "y0" of the title 610*t* of the pull-down button 610*b* to the lower end of the displayable range H (S303). Next, the operating section 11 obtains the height "h" of the pull-down button 610*b* (the title 610*t*) and calculates the displayable number of the selection items in the distance L by dividing the distance L by the height "h" (S304). The calculated displayable number of the selection items corresponds to the maximum displayable number of the selection items when the displaying position of the pull-down list 610*p* is not shifted to the upward direction. Hereinafter, in some cases, the calculated displayable number of the selection items is referred to as the basic displayable number of the selection items.

In the embodiment of the present invention, the height of one selection item is equal to the height of the pull-down button, and in addition, the height of the title is equal to the height of the pull-down button. However, their heights need not always be the same. When the heights are different from each other, the displayable number of the selection items is calculated by considering the height difference.

Figure 20:
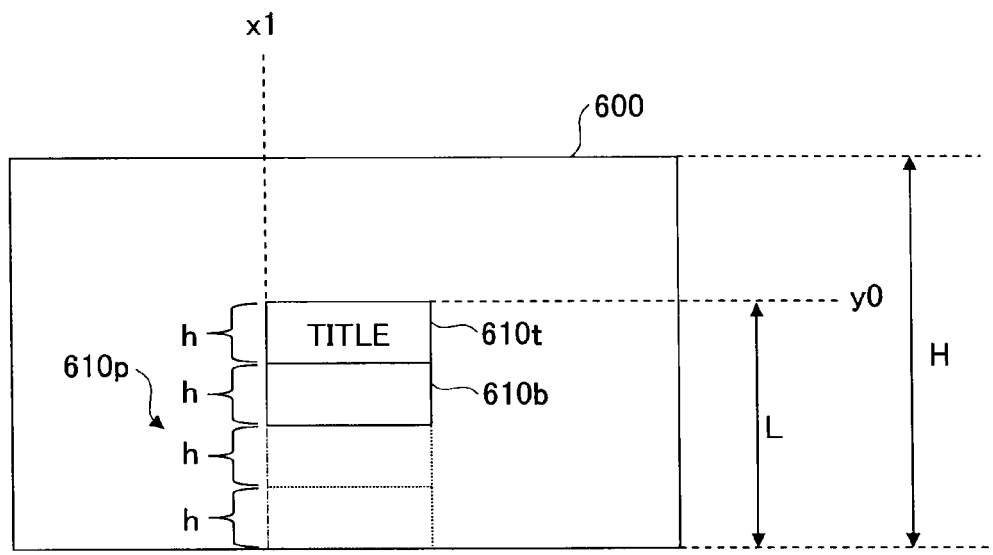
FIG. 20 is a diagram showing the displayable number of the selection items in a distance on the operating screen shown in FIG. 13.

FIG. 20 is a diagram showing the displayable number of the selection items in the distance L. In FIG. 20, four selection items including the title 610t can be displayed.

Next, the operating section 11 compares the number of the selection items including the title per page of the pull-down list received from the controlling section 12 with the basic displayable number of the selection items (S305).

When the number of the selection items including the title per page of the pull-down list received from the controlling section 12 is the basic displayable number of the selection items or less (YES in S306), the Y coordinate value "y0" at the upper end of the title 610t is determined to be the Y coordinate value at the upper end of the pull-down list 610p (S307).

When the number of the selection items including the title per page of the pull-down list received from the controlling section 12 is more than the basic displayable number of the selection items (NO in S306), the operating section 11 compares "the number of the selection items including the title per page of the pull-down list received from the controlling section 12−1" with the basic displayable number of the selection items (S308).

When "the number of the selection items including the title per page of the pull-down list received from the controlling section 12−1" is more than the basic displayable number of the selection items (YES in S308), the operating section 11 determines that the Y coordinate value of the pull-down list to be a value shifted upward by the number of the heights "h" exceeded the compared result (S309). That is, the Y coordinate value at the upper end of the pull-down list is shifted in the upward direction by the number of heights "h" of "the number of the selection items per page−1−the displayable basic number of the selection items" from the Y coordinate value "y0".

When "the number of the selection items including the title per page of the pull-down list received from the controlling section 12−1" is equal to the basic displayable number of the selection items (NO in S308), the operating section 11 shifts the title 610t in the upward direction by the height "h" in the pull-down list (S310).

Figure 21:
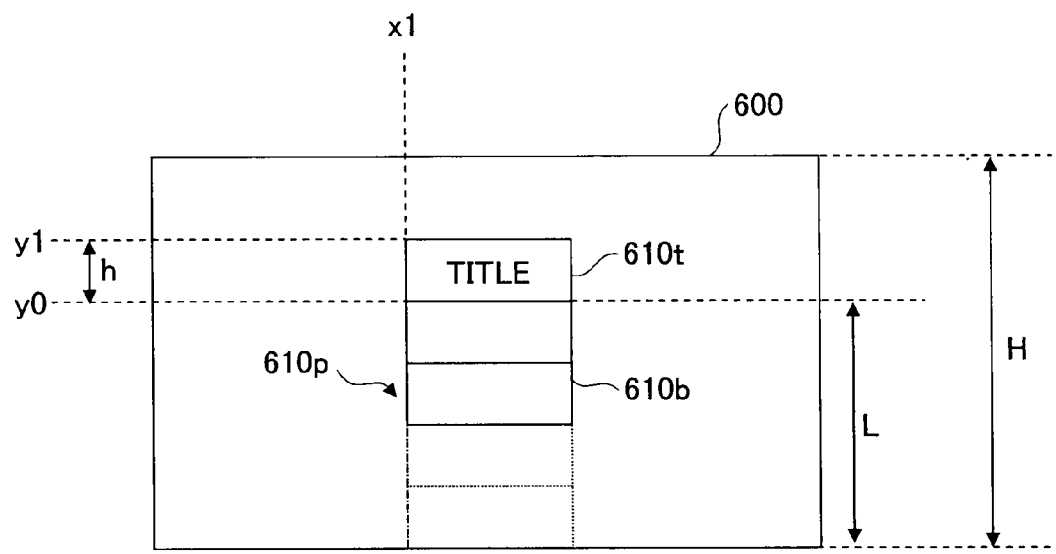
FIG. 21 is a diagram showing the operating screen when the number of the selection items including the title per page of the pull-down list received from the controlling section exceeds by one the basic displayable number of the selection items.

FIG. 21 is a diagram showing the operating screen 600 when the number of the selection items including the title 610t per page of the pull-down list 610p received from the controlling section 12 exceeds by one the basic displayable number of the selection items. In FIG. 21, the number of the selection items per page including the title 610t of the pull-down list 610p received from the controlling section 12 is five, and the basic displayable number of the selection items is four. In this case, in order to display the four selection items in the operating screen 600, the title 610t is shifted by the height "h" in the upward direction. That is, the Y coordinate value at the upper end of the pull-down list 610p is shifted from "y0" to "y1".

Figure 22:
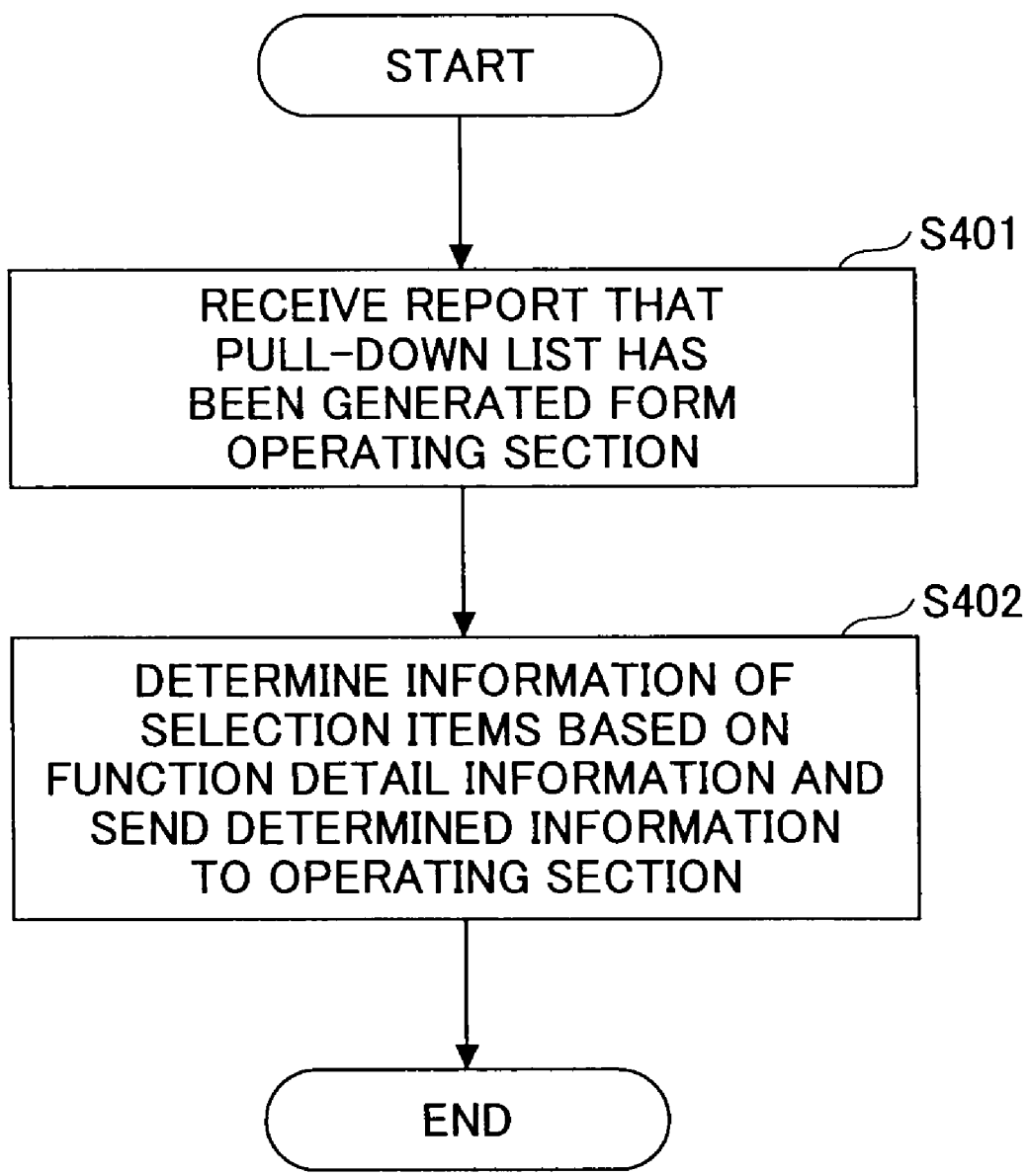
FIG. 22 is a flowchart showing processes for sending information of the selection items to the operating section from the controlling section.

Next, processes in S106 shown in FIG. 11 are described in detail. In the processes, the controlling section 12 sends information of the selection items to the operating section 11. FIG. 22 is a flowchart showing processes for sending information of the selection items to the operating section 11 from the controlling section 12.

First, the controlling section 12 receives a report that the pull-down list has been generated from the operating section 11 (S401, corresponding to S105 in FIG. 11). The controlling section 12 determines information of selection items (ID (identifier) of each item, a displaying character string of each item, a displaying position of the displaying character string, and so on) based on the function detail information 133 shown in FIG. 16, and sends the determined results (information) to the operating section 11 (S402, corresponding to S106 in FIG. 11).

Figure 23:
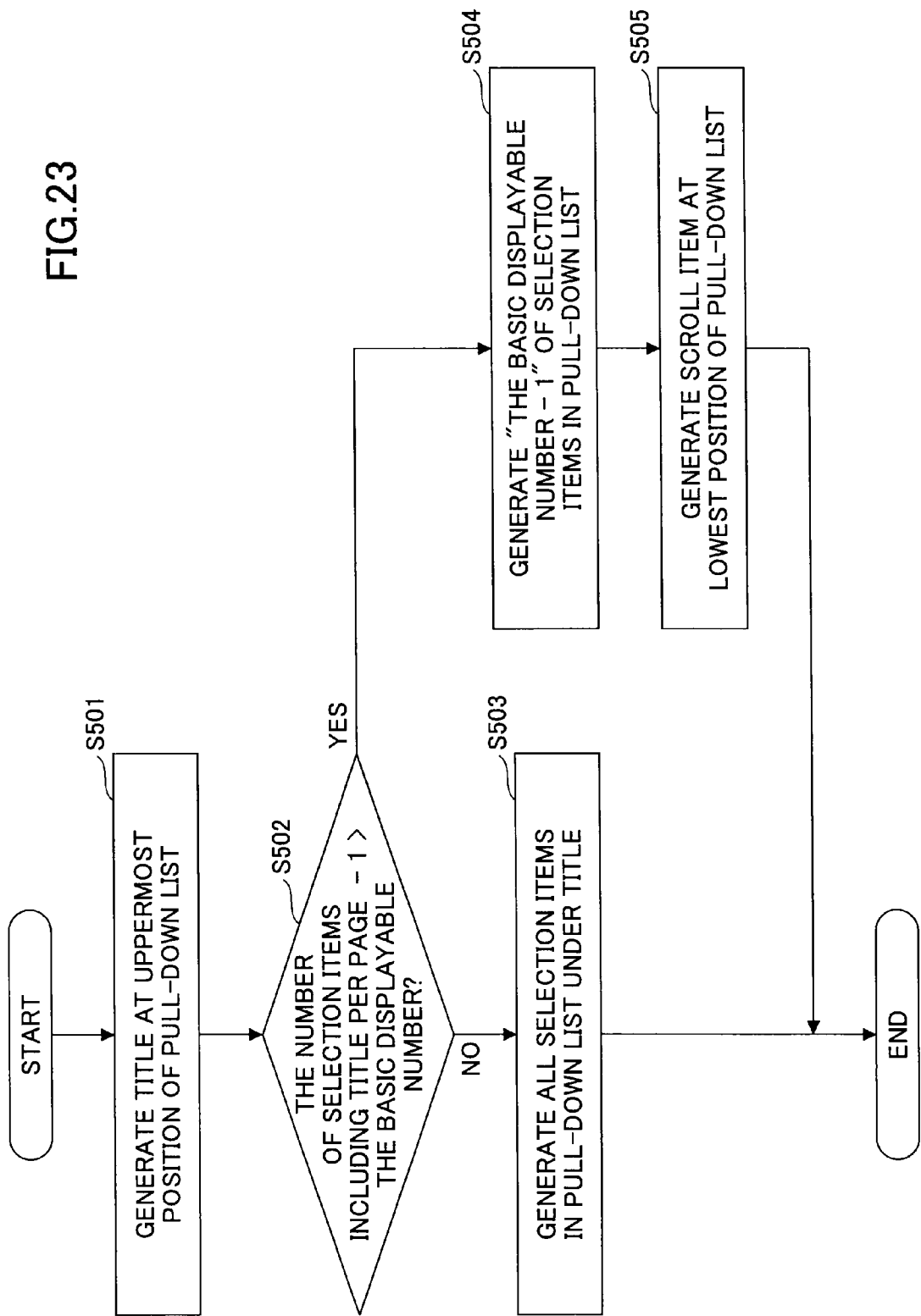
FIG. 23 is a flowchart showing processes for generating the selection items by the operating section.

Next, processes in S107 shown in FIG. 11 are described in detail. In the processes, the controlling section 12 generates the selection items and displays the generated selection items on the pull-down list. FIG. 23 is a flowchart showing processes for generating the selection items by the operating section 11.

First, the operating section 11 generates a title at the uppermost position of the pull-down list (S501). However, when the position of the title is shifted to an upward position, as described in FIG. 6, the title is generated at an upper position from the original position. In this, the character string of the title and the icon of the background of the title are determined based on the information sent from the controlling section 12 described in S102 of FIG. 11 (S210 of FIG. 12).

Next, the operating section 11 compares "the number of the selection items including the title per page of the pull-down list received from the controlling section 12−1" with the basic displayable number of the selection items (S502).

When "the number of the selection items including the title per page of the pull-down list received from the controlling section 12−1" is more than the basic displayable number of the selection items (YES in S502), the operating section 11 generates "the basic displayable number−1 (for the scroll item)" of the selection times in the pull-down list (S504), and the controlling section 11 generates the scroll item at the lowest position of the pull-down list (S505).

When "the number of the selection items including the title per page of the pull-down list received from the controlling section 12−1" is the basic displayable number of the selection items or less (NO in S502), the operating section 11 generates all the selection items in the pull-down list under the title (S503).

The scroll item is determined based on information sent from the controlling section 12 in S102 of FIG. 11 (S210 of FIG. 12). In addition, the number of pages to be displayed can be calculated from the number of the selection items to be displayed and the basic displayable number of the selection items. Since the addition of the scroll item has been considered beforehand (see S209 of FIG. 12), the scroll item does not protrude from the displayable range H.

By the above processes, the operations of the pull-down list described in FIGS. 4 through 10 are realized.

In FIG. 13, an example is described in which the scroll item is not needed. Consequently, the transition screen information 131 shown in FIG. 14 and the function information 132 shown in FIG. 15 do not include scroll information.

Next, an example is described in which a scroll item is required.

Figure 24:
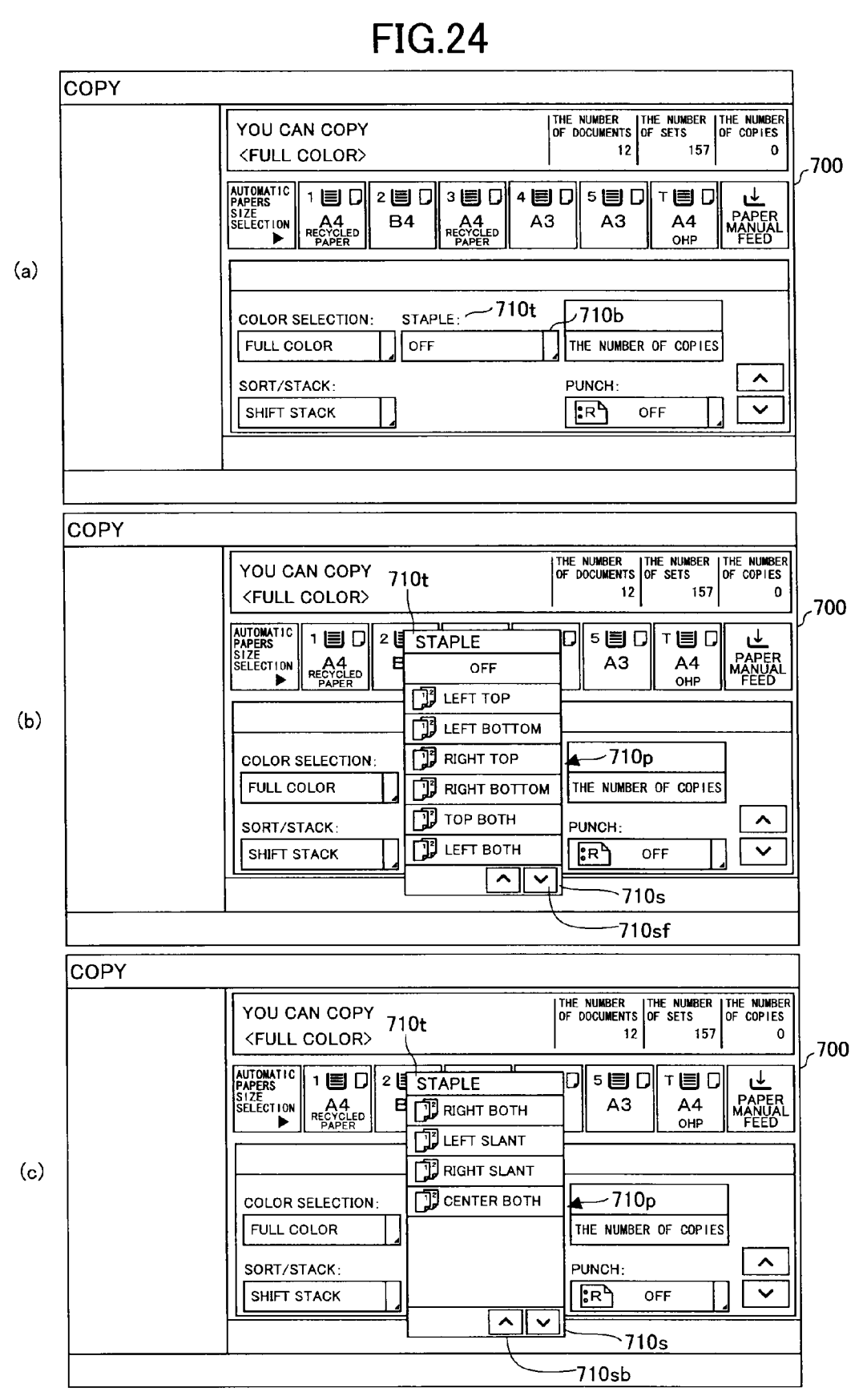

FIG. 24 is a diagram showing an operating screen when a scroll item is displayed in a pull-down list.

As shown in FIG. 24(a), a pull-down button 710b is displayed on an operating screen 700. In addition, a title 710t of the pull-down button 710b is displayed. When the pull-down button 710b is selected in FIG. 24(a), a pull-down list 710p is displayed on the operating screen 700. The pull-down list 710p includes a scroll item 710s. The scroll item 710s includes a forward button 710sf for turning pages and a backward button 710sb for returning (turning back the) pages. When the forward button 710sf is selected in FIG. 24(b), as shown in FIG. 24(c), a next page of the pull-down list is displayed. In the example shown in FIG. 24, since the number of the section items protruded from the first page is four, as shown in FIG. 24(c), the four selection items are displayed. When the backward button 710sb is selected in FIG. 24(c), the pull-down list 710p is returned to that shown in FIG. 24(b).

The transition screen information correlated with the pull-down button 710b (that is, the information of the structure of the pull-down list 710p) is defined as follows. FIG. 25 is a diagram showing transition screen information 134 of the pull-down list 710p. The format of the transition screen information 134 (first definition information) shown in FIG. 25 is similar to that of the transition screen information 131 shown in FIG. 14.

However, as shown in FIG. 25, the transition screen information 134 includes eight list item elements 1342-1 through 1342-8 as sub-elements of a pull-down list element 1341. That is, the maximum displayable number of selection items is eight on the operating screen 700.

In addition, function information for defining selection items to be allocated to the pull-down list 710p is defined as follows. FIG. 26 is a diagram showing function information 135 of the pull-down list 710p. The format of the function information 135 (second definition information) shown in FIG. 26 is similar to that of the function information 132 shown in FIG. 15. However, as shown in FIG. 26, in the function information 135, eleven function elements 1351-1 through 1351-11 are defined as sub-elements of the root element.

As described above, the maximum displayable number of the selection items in the pull-down list 710p is eight; however the number of the selection items to be allocated to the pull-down list 710p is eleven. Therefore, as shown in FIG. 24, the scroll item 710s is added to the pull-down list 710p. In this case, since the scroll item 710s is displayed on the pull-down list 710p, the seven selection items of the eleven section items to be allocated are displayed in the in the first page of the pull-down list 710p and the remaining four selection items are displayed in the second page of the pull-down list 710p. In this case, the title 710t is generally included in the maximum displayable number.

As described above, in the MFP 1 according to the embodiment of the present invention, a selection item (parameter) can be selected in a pull-down list on an operating screen. Therefore, the number of buttons on the operating screen can be decreased. In addition, in the MFP 1 according to the embodiment of the present invention, the layered structure is not deep. Therefore, the operability can be increased.

In addition, according to the embodiment of the present invention, a part of the selection items can be displayed in the upward direction in addition to in the downward direction. Therefore, the operating screen can be effectively utilized. Especially, when the size of the operating screen is small in an image forming apparatus, the pull-down list according to the embodiment of the present invention can be effectively utilized.

In addition, since the selection items can be displayed in the upward direction, using times of a scroll can be decreased and the operability can be increased.

In addition, the basic displayable number of the selection items can be calculated regardless of the position of the position of the pull-down button on the operating screen.

Figure 27:
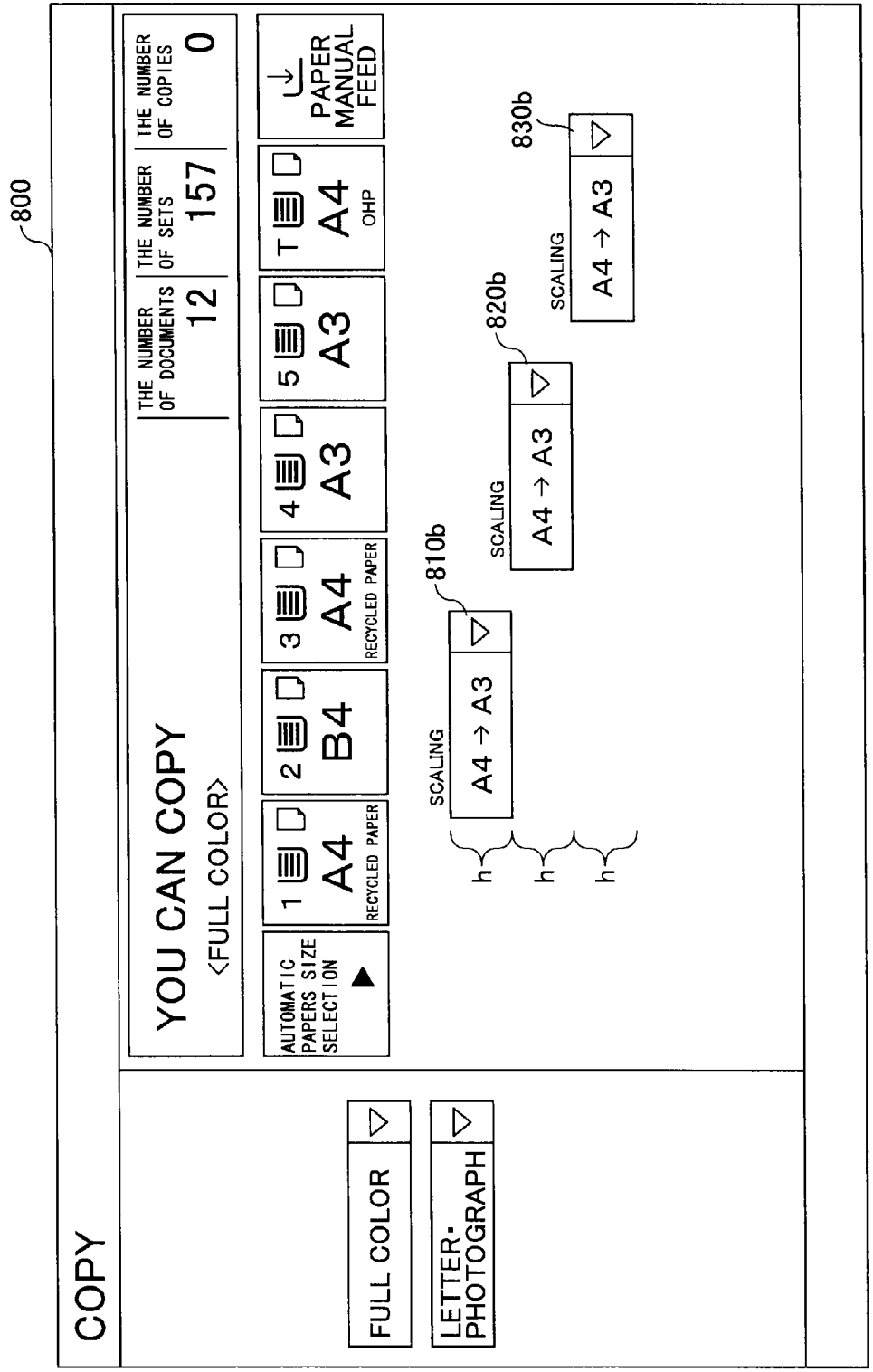
FIG. 27 is a diagram showing an operating screen in which the same three pull-down buttons are displayed at corresponding different positions as an assumption.

FIG. 27 is a diagram showing an operating screen in which the same three pull-down buttons are displayed at the corresponding different positions as an assumption. As shown in FIG. 27, pull-down buttons 810b, 820b, and 830b having the same contents are displayed at the corresponding different positions (heights). That is, the pull-down button 820b is at a position lower than the pull-down button 810b by one height "h" and the pull-down button 830b is at a position lower than the pull-down button 810b by two heights "h".

Figure 28:
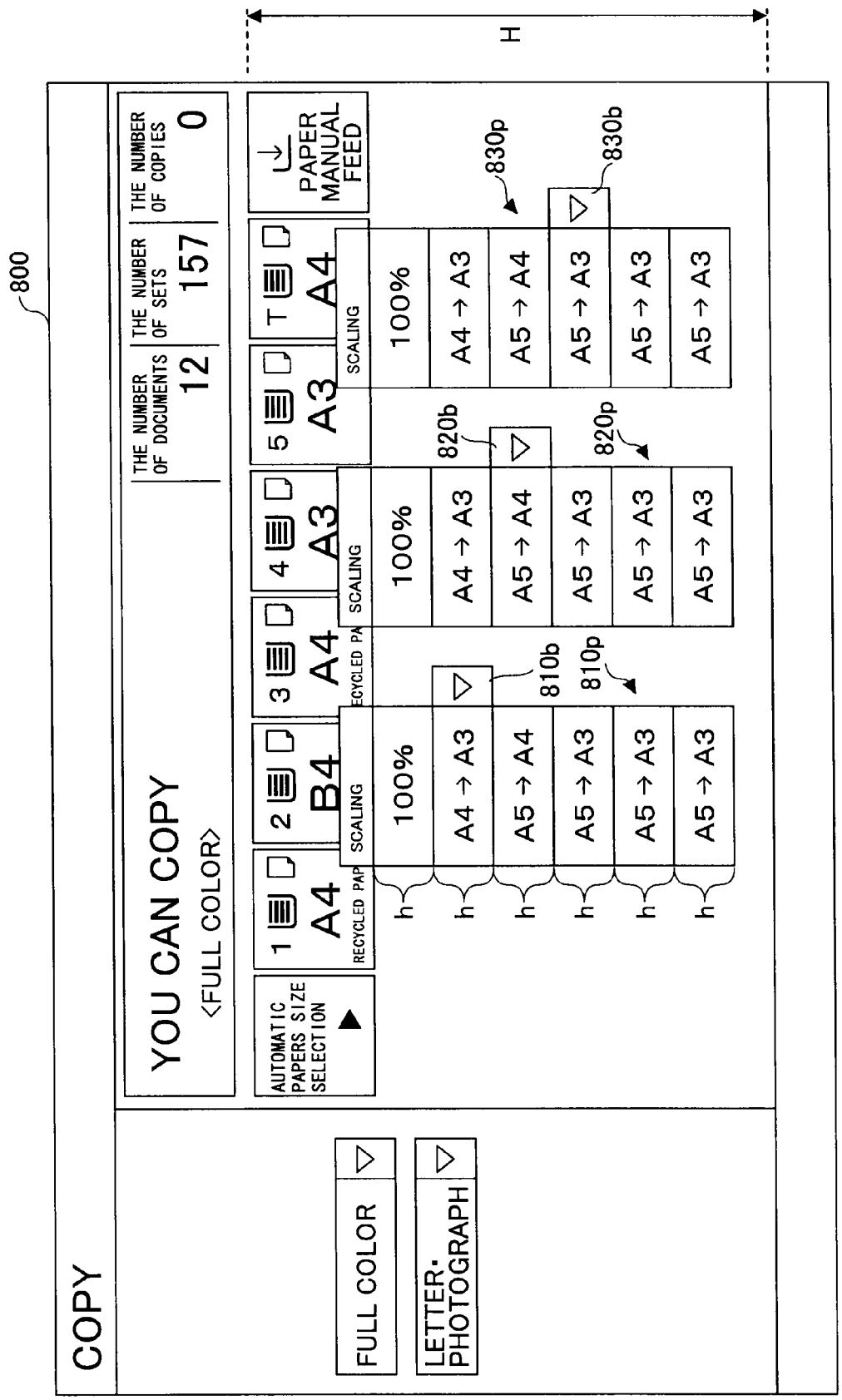
FIG. 28 is a diagram showing the operating screen in which the same three pull-down lists are displayed at corresponding different positions as an assumption.

In this case, in the MFP 1 according to the embodiment of the present invention, the same pull-down lists 810P, 820p, and 830p are displayed as shown in FIG. 28 as an assumption. FIG. 28 is a diagram showing the operating screen 800 in which the same three pull-down lists 810p, 820p, and 830p are displayed at the corresponding different positions as an assumption. In FIG. 28, the displayable range H is also shown.

As shown in FIG. 28, when the pull-down button 810b is selected, the pull-down list 810p is displayed on the operating screen 800. In this case, the upper end of the pull-down list 810p is shifted upward by one height "h" from the pull-down button 810b. In addition, when the pull-down button 820b is selected, the pull-down list 820p is displayed on the operating screen 800. In this case, the upper end of the pull-down list 820p is shifted upward by two heights "h" from the pull-down button 820b. Further, when the pull-down button 830b is selected, the pull-down list 830p is displayed on the operating screen 800. In this case, the upper end of the pull-down list 830p is shifted upward by three heights "h" from the pull-down button 830b.

As described above, since the basic displayable number of the selection items is automatically calculated, even if the position of a pull-down button is changed on an operating screen, the displaying position of the pull-down list can be properly adjusted on the operating screen. In FIGS. 27 and 28, actually, one pull-down button and one pull-down list are displayed.

In the embodiment of the present invention, the maximum displayable number of the selection items is determined by the transition screen information. However, as described above, the maximum displayable number of the selection items can be dynamically calculated based on the layout information on the operating screen by using the height "h" and the displayable range H.

In addition, the extending direction of the pull-down list can be the upward direction instead of the downward direction from the position of the pull-down button. That is, first, the pull-down list can be extended in a direction in which as many as possible of the selection items can be displayed. In addition, the upper end of the pull-down list can be determined so that an approximately equal number of the selection items is displayed in the upward and downward directions with the selected pull-down button as the center. With this the displayable range can be effectively utilized.

In addition, when a user can recognize the title of the pull-down list, the position of the title is not limited to the upper end position of the pull-down list.

In addition, the position of a scroll item is not limited to the lower end position of the pull-down list. The scroll item can be displayed at an upper position in the pull-down list. Further, a scroll bar can be displayed at a side of the pull-down list. However, when a touch panel is used as the operating screen, the scroll item is preferable rather than the scroll bar from a view point of operability.

Further, the present invention is not limited to the specifically disclosed embodiment, and variations and modifications may be made without departing from the scope of the present invention.

The present invention is based on Japanese Priority Patent Application No. 2007-221411, filed on Aug. 28, 2007, with the Japanese Patent Office, the entire contents of which are hereby incorporated herein by reference.

What is claimed is:

1. A display control apparatus, comprising: a number of items determining unit which determines the number of selection items to be simultaneously displayed in an item selection list on an operating screen based on a selection of a button on the operating screen; a position determining unit which determines an upper end position of the item selection list on the operating screen to be a position so that a part of the selection items in the item selection list is displayed in a direction inverse to a normal extending direction of the selection item list with a position of the selected button as a reference based on a comparison of the number of the selection items to be simultaneously displayed with the displayable number of selection items on the operating screen;
 a generating unit which generates the item selection list on the operating screen based on the determined position; and
 a displayable number of items calculating unit which calculates the displayable number of the selection items in the item selection list on the operating screen based on a displayable range of the selection items on the operating screen and a height of each selection item.

2. The display control apparatus as claimed in claim 1, wherein:
 the position determining unit determines the upper end position of the item selection list on the operating screen to be a position so that a part of the selection items in the item selection list is displayed in the direction inverse to the normal extending direction of the selection item list with the position of the selected button as the reference when a part of the selection items in the item selection list is not simultaneously displayed in the normal extending direction of the item selection list.

3. The display control apparatus as claimed in claim 2, wherein: the position determining unit determines the upper end position of the item selection list on the operating screen to be a position so that the number of the selection items unable to be simultaneously displayed in the normal extending direction of the item selection list is displayed in the direction inverse to the normal extending direction of the item selection list.

4. The display control apparatus as claimed in claim 1, wherein: the number of items determining unit determines the number of the selection items to be simultaneously displayed based on a first definition information which defines the maximum displayable number of the selection items and a second definition information which defines the number of selection items to be allocated in the item selection list.

5. The display control apparatus as claimed in claim 1, wherein: the position determining unit determines the upper end of the item selection list to be a position based on a position of the selected button on the operating screen.

6. The display control apparatus as claimed in claim 1, wherein: the generating unit changes a displaying position of a character string signifying the name of the item selection list to a position where the character string does not overlap the item selection list.

7. The display control apparatus as claimed in claim 6, wherein: the generating unit changes the displaying position of the character string onto the upper end position of the item selection list.

8. The display control apparatus as claimed in claim 1, wherein: the generating unit generates a scroll item in the item selection list when the number of the selection items to be simultaneously displayed exceeds the displayable number of the selection items on the operating screen.

9. A display control method in a display control apparatus, comprising: a number of items determining step which determines the number of selection items to be simultaneously displayed in an item selection list on an operating screen based on a selection of a button on the operating screen;
 a position determining step which determines an upper end position of the item selection list on the operating screen to be a position so that a part of the selection items in the item selection list is displayed in a direction inverse to a normal extending direction of the selection item list with a position of the selected button as a reference based on a comparison of the number of the selection items to be simultaneously displayed with the displayable number of selection items on the operating screen; and
 a generating step which generates, using a processor, the item selection list on the operating screen based on the determined position, wherein the number of items determining step determines the number of the selection items to be simultaneously displayed based on a first definition information which defines the maximum displayable number of the selection items and a second definition information which defines the number of selection items to be allocated in the item selection list.

10. The display control method as claimed in claim 9, wherein: the position determining step determines the upper end position of the item selection list on the operating screen to be a position so that a part of the selection items in the item selection list is displayed in the direction inverse to the normal extending direction of the selection item list with the position of the selected button as the reference when a part of the selection items in the item selection list is not simultaneously displayed in the normal extending direction of the item selection list.

11. The display control method as claimed in claim 10, wherein: the position determining step determines the upper end position of the item selection list on the operating screen to be a position so that the number of the selection items unable to be simultaneously displayed in the normal extending direction of the item selection list is displayed in the direction inverse to the normal extending direction of the item selection list.

12. The display control method as claimed in claim 9, further comprising:
 a displayable number of items calculating step which calculates the displayable number of the selection items in the item selection list on the operating screen based on a displayable range of the selection items on the operating screen and a height of each selection item.

13. The display control method as claimed in claim 9, wherein: the position determining step determines the upper end of the item selection list to be a position based on a position of the selected button on the operating screen.

14. The display control method as claimed in claim 9, wherein: the generating step changes a displaying position of a character string signifying the name of the item selection list to a position where the character string does not overlap the item selection list.

15. The display control method as claimed in claim 14, wherein: the generating step changes the displaying position of the character string onto the upper end position of the item selection list.

16. The display control method as claimed in claim 9, wherein: the generating step generates a scroll item in the item selection list when the number of the selection items to be simultaneously displayed exceeds the displayable number of the selection items on the operating screen.

17. A non-transitory computer-readable recording medium with an executable display control program stored thereon, wherein the program, when executed by a processor, causes the processor to perform a method comprising:

determining a number of selection items to be simultaneously displayed in an item selection list on an operating screen based on a selection of a button on the operating screen; determining an upper end position of the item selection list on the operating screen to be a position so that a part of the selection items in the item selection list is displayed in a direction inverse to a normal extending direction of the selection item list with a position of the selected button as a reference based on a comparison of the number of the selection items to be simultaneously displayed with the displayable number of selection items on the operating screen; and generating the item selection list on the operating screen based on the determined position, wherein determining the number of the selection items to be simultaneously displayed is based on a first definition information which defines the maximum displayable number of the selection items and a second definition information which defines the number of selection items to be allocated in the item selection list.

18. The non-transitory computer-readable recording medium as claimed in claim 17, further comprising:

determining the upper end position of the item selection list on the operating screen to be a position so that a part of the selection items in the item selection list is displayed in the direction inverse to the normal extending direction of the selection item list with the position of the selected button as the reference when a part of the selection items in the item selection list is not simultaneously displayed in the normal extending direction of the item selection list.

* * * * *